(12) United States Patent
Shepherd et al.

(10) Patent No.: US 9,945,397 B2
(45) Date of Patent: Apr. 17, 2018

(54) SYSTEMS AND METHODS FOR ACTUATING SOFT ROBOTIC ACTUATORS

(71) Applicant: President and Fellows of Harvard College, Cambridge, MA (US)

(72) Inventors: Robert F. Shepherd, Brooktondale, NY (US); Adam Stokes, Watertown, MA (US); Stephen A. Morin, Lincoln, NE (US); Ludovico Cademartiri, Somerville, MA (US); Jacob Freake, Willimantic, CT (US); Rui Nunes, Somerville, MA (US); Xin Chen, Cambridge, MA (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 14/243,656

(22) Filed: Apr. 2, 2014

(65) Prior Publication Data
US 2014/0208731 A1   Jul. 31, 2014
US 2017/0030381 A9   Feb. 2, 2017

Related U.S. Application Data

(63) Continuation of application No. PCT/US2012/059226, filed on Oct. 8, 2012, and a
(Continued)

(51) Int. Cl.
*F01B 29/08*   (2006.01)
*F15B 13/04*   (2006.01)
(Continued)

(52) U.S. Cl.
CPC ............. *F15B 13/04* (2013.01); *B25J 9/1075* (2013.01); *B25J 9/142* (2013.01)

(58) Field of Classification Search
CPC ......... F15B 13/04; F15B 15/103; B25J 9/142; B25J 9/1075; B25J 11/00
(Continued)

(56) References Cited

U.S. PATENT DOCUMENTS 3,284,964 A    11/1966  Saito
3,343,864 A *  9/1967  Baer .................... B25J 15/0009
                                                 294/119.3
(Continued)

FOREIGN PATENT DOCUMENTS

EP    1190819 A1    3/2002
EP    1319845 A2    6/2003
(Continued)

OTHER PUBLICATIONS

Albu-Schaffer, A. et al., "Soft Robotics," IEEE Robotics & Automation Magazine, vol. 15, pp. 20-30 (Sep. 2008).
(Continued)

*Primary Examiner* — Laert Dounis
*Assistant Examiner* — Kelsey Stanek
(74) *Attorney, Agent, or Firm* — Wilmer Cutler Pickering Hale and Dorr LLP

(57) ABSTRACT

Systems and methods for providing a soft robot is provided. In one system, a robotic device includes a flexible body having a fluid chamber, where a portion of the flexible body includes an elastically extensible material and a portion of the flexible body is strain limiting relative to the elastically extensible material. The robotic device can further include a pressurizing inlet in fluid communication with the fluid chamber, and a pressurizing device in fluid communication with the pressurizing inlet, the pressurizing device including a reaction chamber configured to accommodate a gas-producing chemical reaction for providing pressurized gas to the pressurizing inlet.

16 Claims, 23 Drawing Sheets

Related U.S. Application Data continuation-in-part of application No. 13/885,967, filed as application No. PCT/US2011/061720 on Nov. 21, 2011, now Pat. No. 9,464,642.

(60) Provisional application No. 61/598,691, filed on Feb. 14, 2012, provisional application No. 61/562,211, filed on Nov. 21, 2011, provisional application No. 61/544,849, filed on Oct. 7, 2011, provisional application No. 61/415,508, filed on Nov. 19, 2010.

(51) Int. Cl.
    *B25J 9/10* (2006.01)
    *B25J 9/14* (2006.01)

(58) Field of Classification Search
    USPC .............................. 60/516, 327, 407; 92/92
    See application file for complete search history.

(56) References Cited

U.S. PATENT DOCUMENTS

| | | | |
|---|---|---|---|
| 3,594,232 A | 7/1971 | Spahrbier | |
| 3,601,442 A | 8/1971 | Orndorff | |
| 3,713,685 A | 1/1973 | Ewing | |
| 3,987,528 A | 10/1976 | Zemek et al. | |
| 4,535,225 A * | 8/1985 | Wolf | H05B 7/185 219/121.52 |
| 4,751,869 A | 6/1988 | Paynter | |
| 4,784,042 A | 11/1988 | Paynter | |
| 4,815,782 A | 3/1989 | Craig et al. | |
| 4,928,926 A | 5/1990 | Bloemendal et al. | |
| 5,018,506 A | 5/1991 | Danna et al. | |
| 5,021,064 A * | 6/1991 | Caines | A61F 2/68 623/26 |
| 5,156,081 A | 10/1992 | Suzumori | |
| 5,317,952 A | 6/1994 | Immega | |
| 5,327,038 A * | 7/1994 | Culp | B62D 57/00 310/306 |
| 5,381,563 A * | 1/1995 | Isabelle | A61H 33/026 137/859 |
| 5,385,080 A | 1/1995 | Suzumori | |
| 5,568,957 A | 10/1996 | Haugs | |
| 5,619,993 A | 4/1997 | Lee | |
| 5,697,285 A | 12/1997 | Nappi et al. | |
| 5,833,291 A | 11/1998 | Haugs | |
| 6,052,992 A | 4/2000 | Eroshenko | |
| 6,125,492 A * | 10/2000 | Prowse | E04H 4/1663 137/843 |
| 6,178,872 B1 | 1/2001 | Schulz | |
| 6,718,766 B2 | 4/2004 | Seto et al. | |
| 6,732,015 B2 * | 5/2004 | Maeda | B25J 9/142 244/158.1 |
| 6,772,673 B2 | 8/2004 | Seto et al. | |
| 7,086,322 B2 | 8/2006 | Schulz | |
| 7,258,379 B2 | 8/2007 | Ono et al. | |
| 7,327,067 B2 | 2/2008 | Ishibashi et al. | |
| 7,331,273 B2 | 2/2008 | Kerekes et al. | |
| 7,617,762 B1 | 11/2009 | Ragner | |
| 7,654,595 B2 | 2/2010 | Yokoyama et al. | |
| 2002/0157388 A1 * | 10/2002 | Seto | B25J 9/142 60/325 |
| 2003/0226355 A1 * | 12/2003 | Simburger | F15B 15/103 60/484 |
| 2004/0050247 A1 | 3/2004 | Topping | |
| 2004/0118366 A1 | 6/2004 | Kluge | |
| 2005/0282462 A1 | 12/2005 | Panec et al. | |
| 2009/0301073 A1 * | 12/2009 | Mueller | B60K 6/12 60/327 |

FOREIGN PATENT DOCUMENTS

| | | |
|---|---|---|
| JP | 8-323676 | 12/1996 |
| JP | 2006204612 A | 8/2006 |
| WO | WO-98/49976 A1 | 11/1998 |
| WO | WO-0179707 A1 | 10/2001 |
| WO | WO-2006036067 A2 | 4/2006 |
| WO | WO-2006080088 A1 | 8/2006 |

OTHER PUBLICATIONS

Chiechi, R. C. et al., "Eutectic Gallium-Indium (EGaIn): A Moldable Liquid Metal for Electrical Characterization of Self-Assembled Monolayers," Angewandte Chemie, vol. 47, pp. 142-144 (2008).

Fu, Y. et al., "Design, fabrication and testing of piezoelectric polymer PVDF microactuators," Smart Materials and Structures, vol. 15, No. 1, pp. S141-S146, 8 pages (Feb. 2006).

Goldfarb, M. et al., "Design and Energetic Characterization of a Liquid-Propellant-Powered Actuator for Self-Powered Robots," IEEE/ASME Transactions on Mechatronics, vol. 8, No. 2, pp. 254-262 (Jun. 2003).

International Search Report and Written Opinion issued by the European Patent Office as International Searching Authority for International Application No. PCT/US2012/034772 dated Jul. 23, 2012 (9 pages).

Kazerooni, H., "Design and Analysis of Pneumatic Force Generators for Mobile Robotic Systems," IEEE/ASME Transactions on Mechatronics, vol. 10, No. 4, pp. 411-418 (Aug. 2005).

Keplinger, C. et al., "Rontgen's electrode-free elastomer actuators without electromechanical Pull-in instability," PNAS, vol. 107, No. 10, pp. 4505-4510 (Mar. 9, 2010).

Mosadegh, B. et al., "Integrated elastomeric components for autonomous regulation of sequential and oscillatory flow switching in microfluidic devices," Nature Physics, vol. 6, pp. 433-437 (Apr. 18, 2010).

Oh, K. W. and Ahn, C. H., "Topical Review: A review of microvalves," J. Micromech. Microeng., vol. 16, pp. R13-R39 (2006).

Pelrine, R. et al., "High-Speed Electrically Actuated Elastomers with Strain Greater Than 100%," Science, vol. 287, No. 5454, pp. 836-839,6 pages (Feb. 4, 2000).

Qin, L. et al., "Self-powered microfluidic chips for multiplexed protein assays from whole blood," Lab Chip, vol. 9, No. 14, pp. 2016-2020, 11 pages (Jul. 21, 2009).

Richards, A. W. and Odegard, G. M., "Constitutive Modeling of Electrostrictive Polymers Using a Hyperelasticity-Based Approach," Journal of Applied Mechanics, vol. 77, pp. 014502-1-014502-5 (Jan. 2010).

Salem, I. A. et al., "Kinetics and Mechanisms of Decomposition Reaction of Hydrogen Peroxide in Presence of Metal Complexes," Int. J. Chem. Kin., vol. 32, pp. 643-666 (2000).

Thorsen, T. et al., "Microfluidic Large-Scale Integration," Science, vol. 298, pp. 580-584 (Oct. 18, 2002).

Trivedi, D. et al., "Soft Robotics: Biological inspiration, state of the art, and future research," Applied Bionics and Biomechanics, vol. 5, No. 3, pp. 99-117, 20 pages (Sep. 2008).

Vitale, F. et al., "Low-temperature $H_2O_2$-powered actuators for biorobotics: Thermodynamic and kinetic analysis," IEEE International Conference on Robotics and Automation, Anchorage, AK, pp. 2197-2202 (May 3-8, 2010).

Wait, K. W. et al., "Self locomotion of a spherical rolling robot using a novel deformable pneumatic method," IEEE International Conference on Robotics and Automation, Anchorage, AK, pp. 3757-3762 (May 3-8, 2010).

Wang, Y. et al., "Bipolar Electrochemical Mechanism for the Propulsion of Catalytic Nanomotors in Hydrogen Peroxide Solutions," Langmuir, vol. 22, pp. 10451-10456 (2006).

Whitehead, John C., "Hydrogen Peroxide Propulsion for Smaller Satellites," 12th AIAA/USU Conference on Small Satellites, SSC98-VIII-1, pp. 1-13 (1998).

Bar-Cohen, Y. et al., "Low-mass Muscle Actuators using electroactive polymers (EAP)," Proceedings of SPIE's 5th Annual International Symposium on Smart Structures and Materials, San Diego, CA. Paper No. 3324-32, 6 pages (Mar. 1-5, 1998).

Brown, et al., "Universal robotic gripper based on the jamming of granular material" and "Universal Robotic Gripper based on the

(56) References Cited

OTHER PUBLICATIONS

Jamming of Granular Material: Supplementary Material" PNAS, vol. 107, No. 44, pp. 18809-18814, 12 pages (Nov. 2010).

Correll, N. et al., "Soft Autonomous Materials-Using Active Elasticity and Embedded Distributed Computation", 12th International Symposium on Experimental Robotics, Delhi, India, Dec. 18-21, 2010 (14 pages).

Daerden, F. and Lefeber, D., "Pneumatic Artificial Muscles: actuators for robotics and automation," European Journal of Mechanical and Environmental Engineering, Vrije Universiteit Brussel, Department of Mechanical Engineering, 13 pages (2000).

Fujiwara, N. et al., "Linear Expansion and Contraction of Paired Pneumatic Balloon Bending Actuators Toward Telescopic Motion", 22th IEEE Int. Conf. On Micro Electro Mechanical Systems, ( MEMS 2009 ), Sorrento, Italy (1 page).

Galloway, Kevin C., "Soft Actuator Prior Art Survey," Dec. 12, 2012 (34 pages).

Hamlen, R. P. et al., "Electrolytically Activated Contractile Polymer," Nature, vol. 206, No. 4989, pp. 1149-1150 (Jun. 12, 1965).

International Search Report and Written Opinion issued by the European Patent Office as International Searching Authority for International Patent Application No. PCT/US2011/061720 dated May 8, 2013 (9 pages).

International Search Report and Written Opinion issued by the U.S. Patent and Trademark Office as International Searching Authority for International Application No. PCT/US2012/059226 dated Jun. 19, 2013 (12 pages).

Kim, S. et al., "Micro artificial muscle fiber using NiTi spring for soft robotics", The 2009 IEEE/RSJ International Conference on Intelligent Robots and Systems, St. Louis, USA, pp. 2228-2234, 7 pages (Oct. 11-15, 2009).

Konishi, S. et al., "Fluid-Resistive Bending Sensor Compatible with a Flexible Pneumatic Balloon Actuator," Journal of Robotics and Mechatronics, vol. 20, No. 3, pp. 436-437 (Jan. 24, 2008).

Konishi, S. et al., "Merging micro and macro robotics toward micro manipulation for biomedical operation", Proceedings of the 36th International Symposium on Robotics, 6 pages (2005).

Laschi, C. et al., "Design of a biomimetic robotic octopus arm", Bioinspiration & Biomimetics, vol. 4, No. 1, 9 pages (Mar. 2009).

Marchese, A. D. et al., "Soft Robot Actuators using Energy-Efficient Valves Controlled by Electropermanent Magnets," International Conference on Intelligent Robots and Systems, pp. 756-761, 7 pages (2011).

Micro/Nano Mechatronics LAB., "Fluid-Resistive Bending Sensor Having Perfect Compatibility with Flexible Pneumatic Balloon Actuator", Group Robotics Ritsumeikan University, 1 page (No date Listed).

Morin, S. A. et al., "Camouflage and Display for Soft Machines," Science, vol. 337, pp. 828-832, 6 pages (2012).

Mosadegh, B. et al., "Pneumatic Networks for Soft Robotics that Actuate Rapidly," Adv. Funct. Mater., vol. 24, No. 15, 20 pages (2013).

Nakajima, K. et al., "Timing and Behavioral Efficiency in Controlling a Soft Body: A Case Study in Octopus Reaching Behavior," The 2nd International Conference on Morphological Computation, 3 pages (2011).

Onal, C. D. et al, "Soft mobile robots with on-board chemical pressure generation", 15th International Symposium on Robotics Research, Flagstaff, AZ, 16 pages (Aug. 28-Sep. 1, 2011).

Osada, Y. and Gong, J.-P., "Soft and Wet Materials: Polymer Gels," Advanced Materials, vol. 10, No. 11, pp. 827-837, 11 pages (1998).

Otake, M. et al., "Motion design of a starfish-shaped gel robot made of electro-active polymer gel," Robotics and Autonomous Systems, vol. 40, pp. 185-191, 7 pages (2002).

Pritts, M. B. et al., "Design of an Artificial Muscle Continuum Robot," Proceedings of the 2004 IEEE, International Conference on Robotics & Automation, New Orleans, LA, pp. 4742-4746 (Apr. 2004).

Rahn, Christopher D., "Biologically Inspired Design of Soft Robotic Manipulators," Biodynotics, Biologically Inspired Dynamic Robotics Presentation, 32 pages (No date listed).

Steitz, E. et al, "JSEL: Jamming Skin Enabled Locomotion," The 2009 IEEE/RSJ International Conference on Intelligent Robots and Systems, St. Louis, USA, 6 pages (Oct. 11-15, 2009).

Suzumori, Koichi, "Elastic materials producing compliant robots," Robotics and Autonomous Systems, vol. 18, pp. 135-140 (1996).

Symposium L—NEMS/MEMS Technology and Devices, International Conference on Materials for Advanced Technologies 2009 and International Union of Materials Research Societies—International Conference in Asia 2009 (60 pages).

Trivedi, D. et al., "Geometrically exact dynamic models for soft robotic manipulators," Proceedings of the 2007 IEEE/RSJ International Conference on Intelligent Robots and Systems, San Diego, CA, USA, 6 pages (Oct. 29-Nov. 2, 2007).

\* cited by examiner

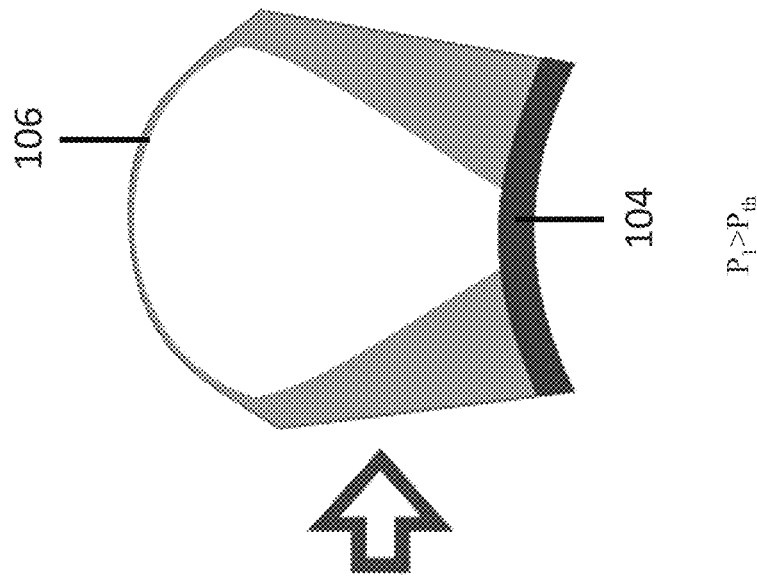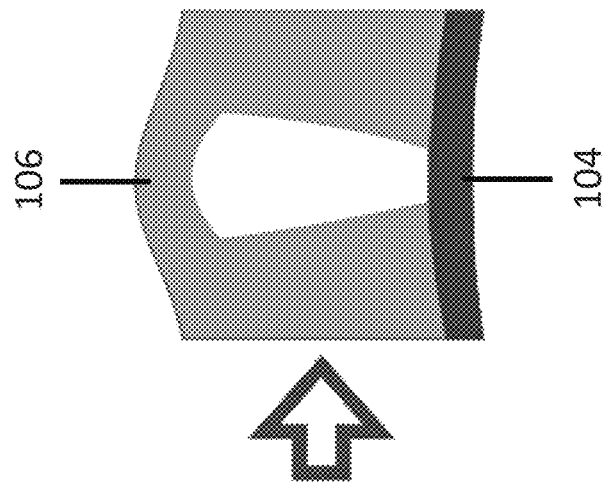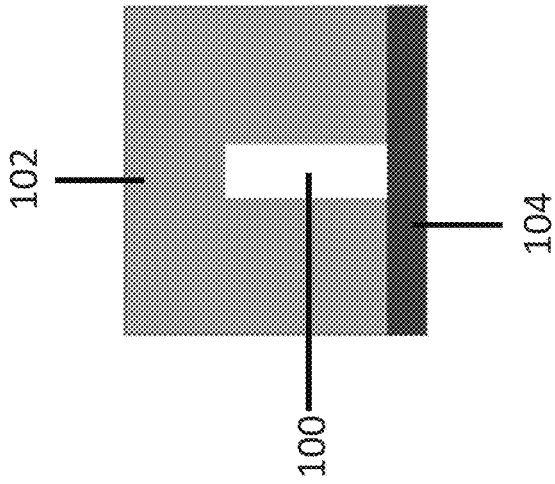

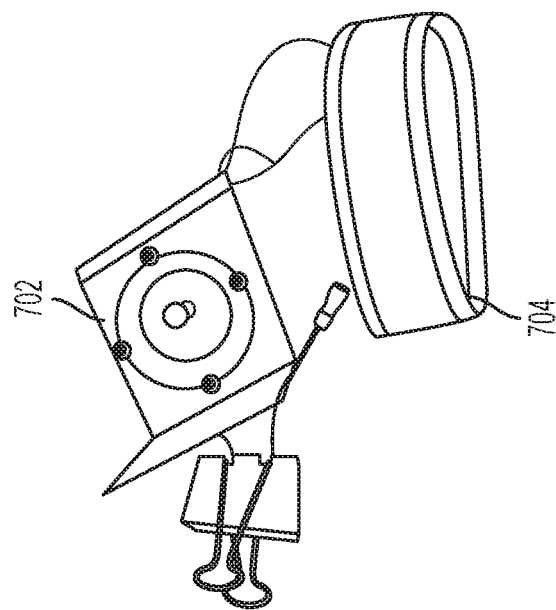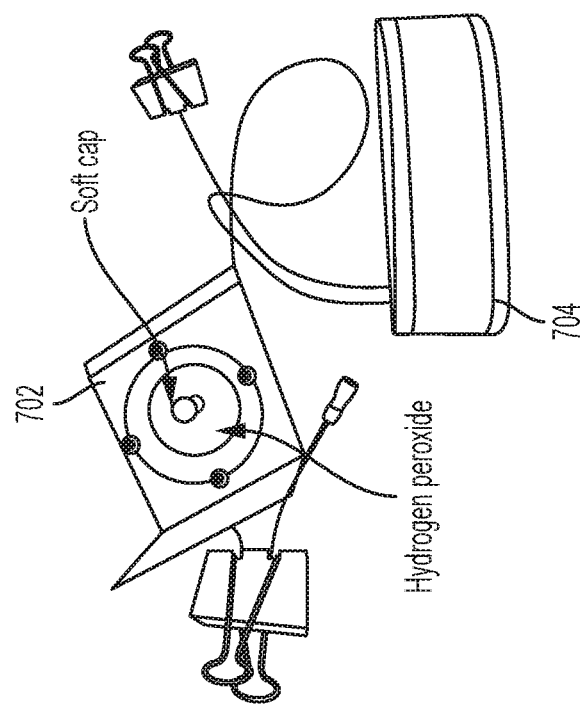
FIG. 7

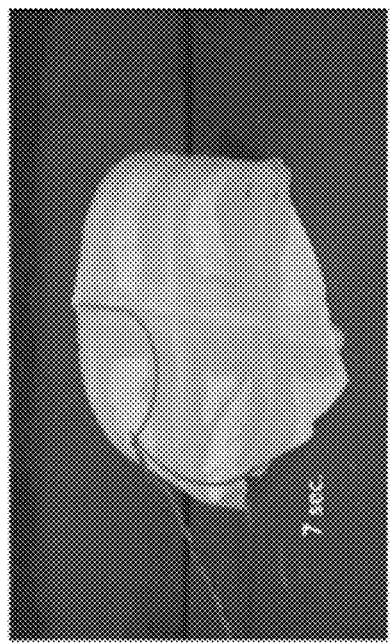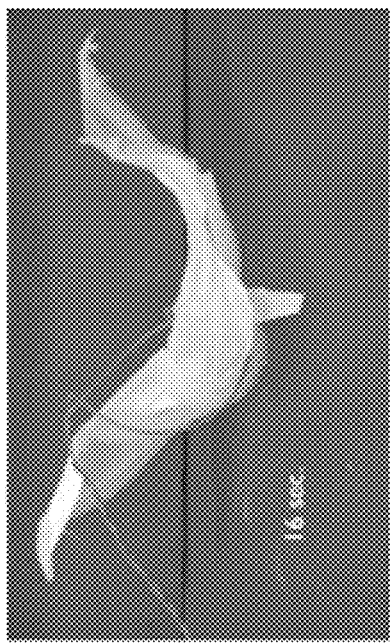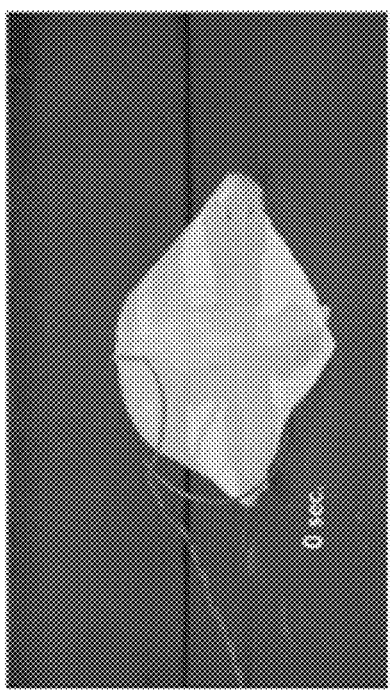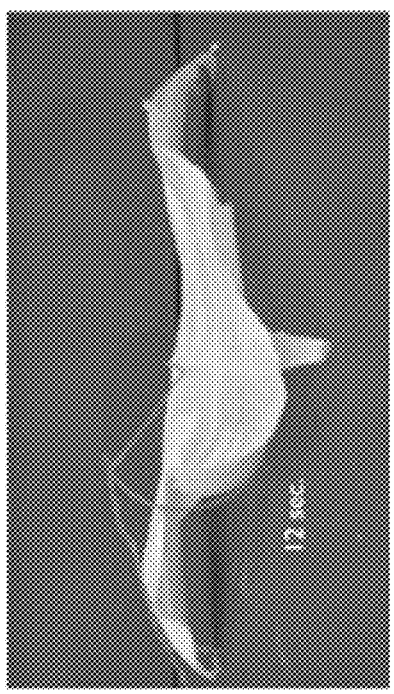
FIG. 8

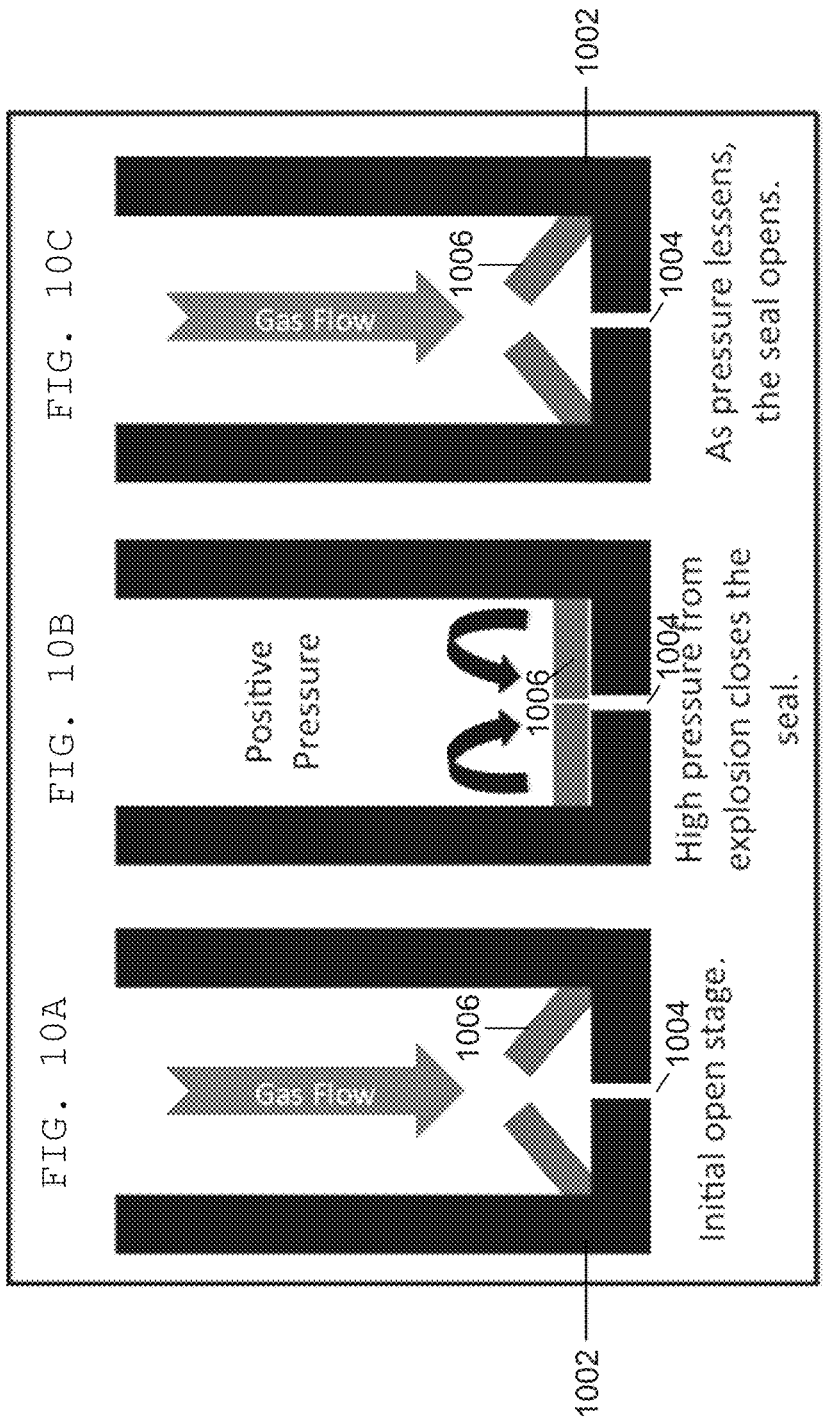

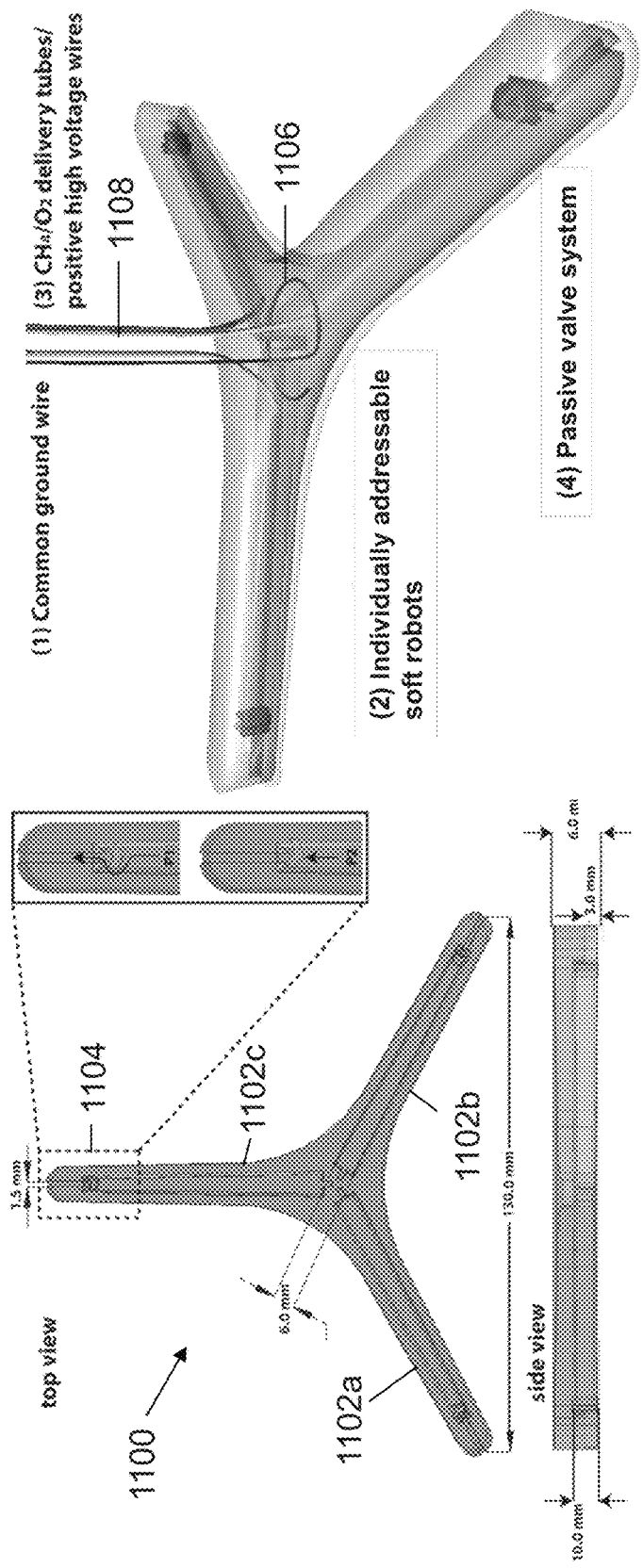

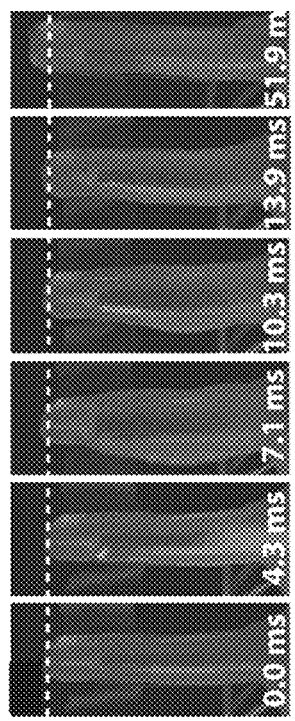
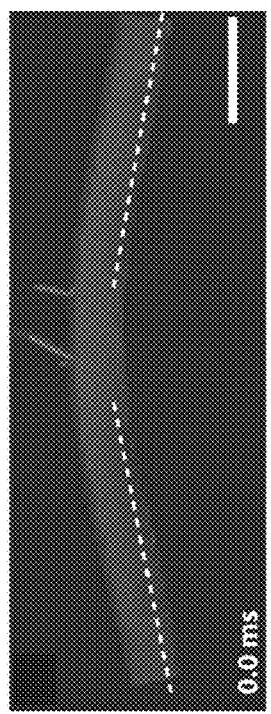
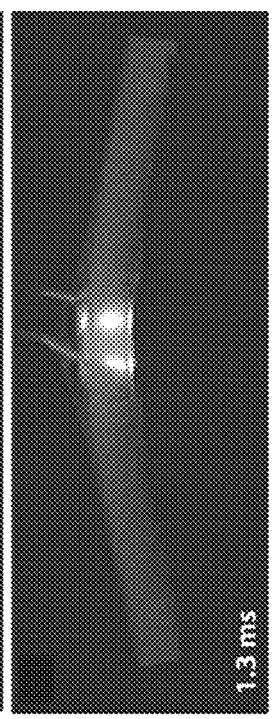
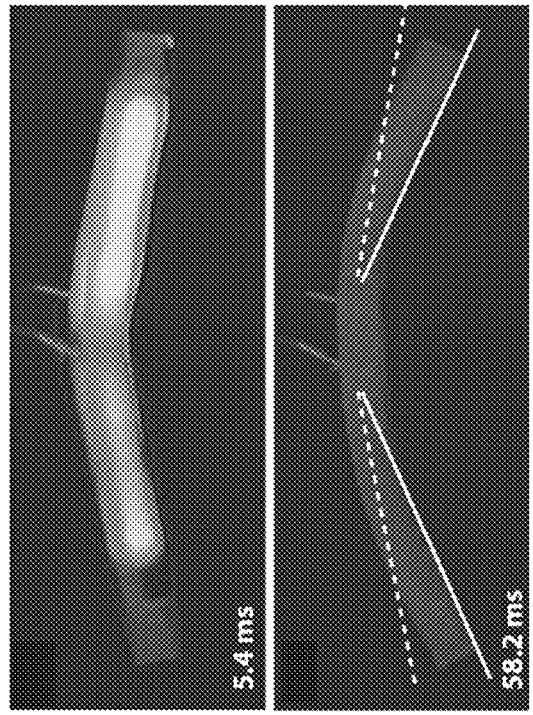
FIG. 13A
FIG. 13B
FIG. 13C
FIG. 13D
FIG. 13E

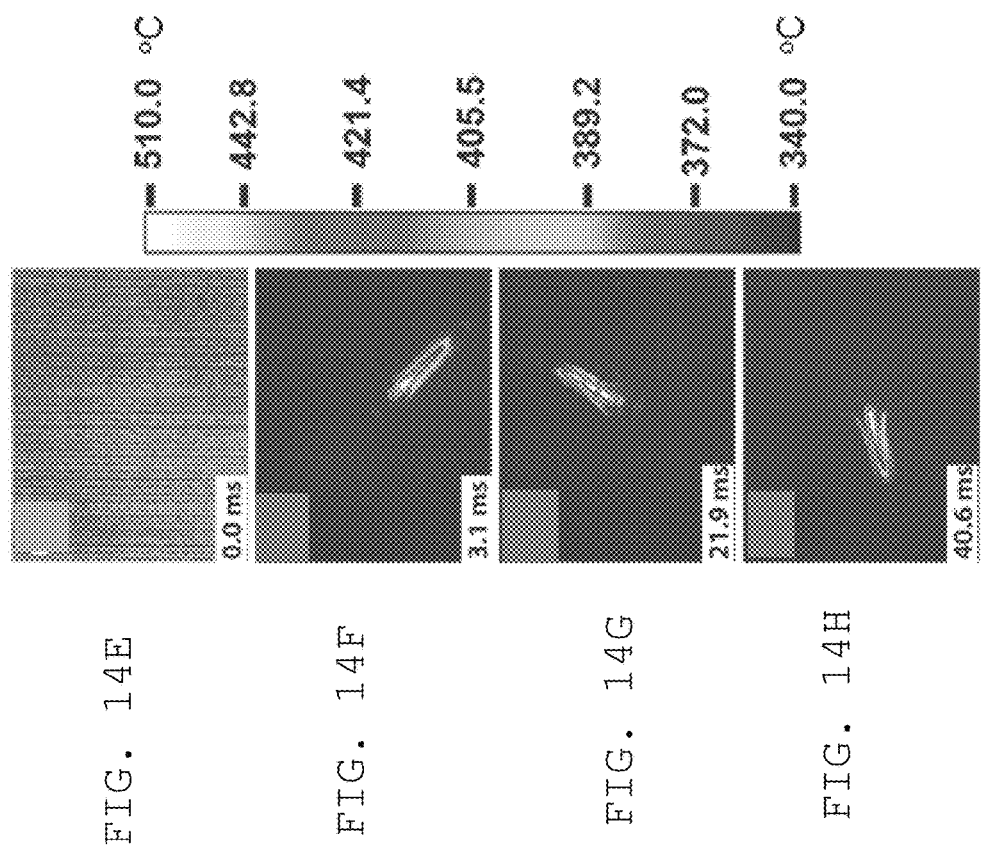

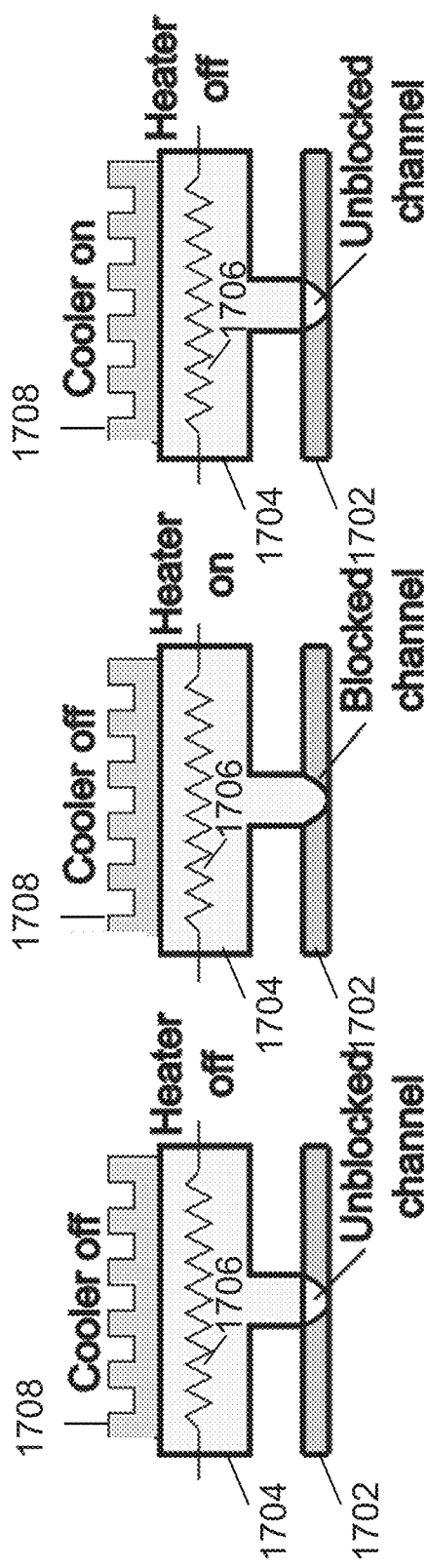

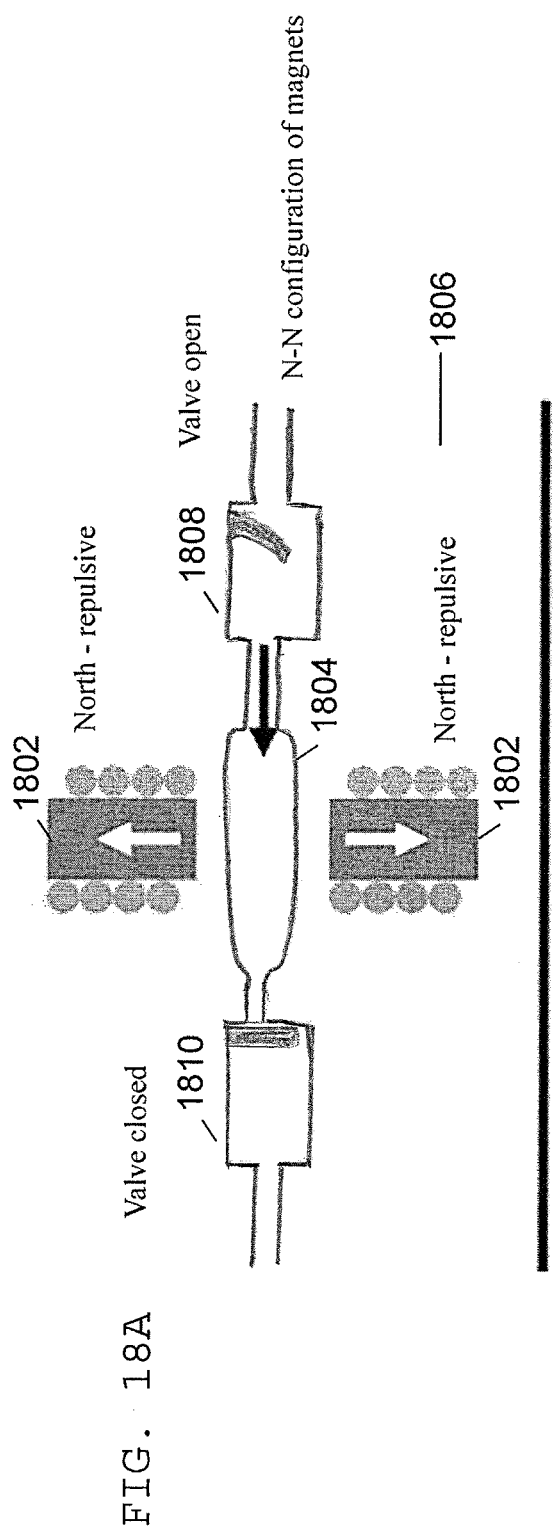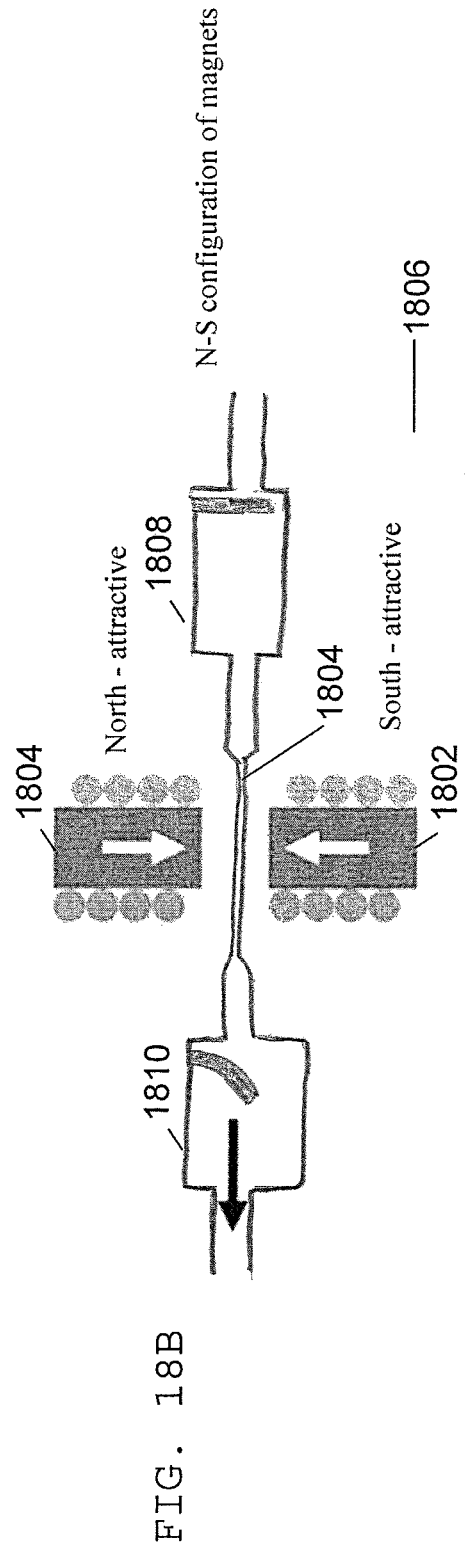
FIG. 18A
FIG. 18B

SYSTEMS AND METHODS FOR ACTUATING SOFT ROBOTIC ACTUATORS

CROSS-REFERENCE TO RELATED APPLICATIONS

This application is a continuation application of co-pending International Application No. PCT/US2012/059226, filed Oct. 8, 2012, which claims benefit under 35 U.S.C. § 119(e) of U.S. Provisional Patent Application No. 61/544,849, entitled "Soft Robotic Actuators," filed Oct. 7, 2011; U.S. Provisional Patent Application No. 61/562,211, entitled "Soft Robotic Actuators," filed Nov. 21, 2011; and U.S. Provisional Patent Application No. 61/598,691, entitled "Soft Robotic Actuators," filed Feb. 14, 2012. This application is also a continuation-in-part application of co-pending U.S. patent application Ser. No. 13/885,967, entitled "SOFT ROBOTIC ACTUATORS", by Ilievski et al., which is a national stage application, under 35 U.S.C. § 371, of a PCT Application No. PCT/US2011/061720 filed Nov. 21, 2011, which claims benefit of U.S. Provisional Patent Application No. 61/415,508, entitled "Soft Robotic Actuators," filed Nov. 19, 2010; and of U.S. Provisional Patent Application No. 61/544,849, entitled "Soft Robotic Actuators," filed Oct. 7, 2011. All of the above-mentioned patent applications are hereby incorporated herein by reference in their entireties.

INCORPORATION BY REFERENCE

All patents, patent applications and publications cited herein are hereby incorporated by reference in their entirety in order to more fully describe the state of the art as known to those skilled therein as of the date of the invention described herein.

STATEMENT REGARDING FEDERALLY SPONSORED RESEARCH OR DEVELOPMENT

The present invention was made with United States government support under Grant Nos. W911NF-08-1-0143, W911NF-08-C-0060 and W911NF-11-1-0094 awarded by Defense Advanced Research Projects Agency (DARPA.) The United States government has certain rights in this invention.

BACKGROUND

Most robots are constructed using so-called "hard" body plans; that is, a rigid (usually metal) skeleton, electrical or hydraulic actuation, electromechanical control, sensing, and feedback. These robots are very successful at the tasks for which they were designed (e.g., heavy manufacturing in controlled environments) but have severe limitations when faced with more demanding tasks (for example, stable motility in demanding environments): tracks and wheels perform less well than legs and hooves.

Evolution has selected a wide range of body plans for mobile organisms. Many approaches to robots that resemble animals with skeletons are being actively developed. A second class of robot—those based on animals without skeletons—are much less explored, for a number of reasons: i) there is a supposition that "marine-like" organisms (squid) will not operate without the buoyant support of water; ii) the materials and components necessary to make these systems are not available; iii) the major types of actuation used in them (for example, hydrostats) are virtually unused in conventional robotics. These systems are intrinsically very different in their capabilities and potential uses than hard-bodied systems. While they will (at least early in their development) be slower than hard-bodied systems, they will also be more stable and better able to move through constrained spaces (cracks, rubble), lighter, and less expensive.

Robots, or robotic actuators, which can be described as "soft" are most easily classified by the materials used in their manufacture and their methods of actuation. Certain types of soft robotic actuation leveraged intrinsic properties of certain soft materials, such as a reversible coiling and uncoiling of a polymeric material based on the pH of the surrounding medium, a electrolytic contraction of a polymeric material, swelling of polymeric gel, and electronic control of dielectric-based materials. Other types of soft robotic actuation leveraged pressurization of sealed chambers fabricated from extensible polymers. This type of actuation has been used on the millimeter scale to fabricate certain functional actuators.

Pneumatic soft robotic actuators can be manufactured using inextensible materials, which rely on architectures such as bellows. McKibben actuators, also known as pneumatic artificial muscles (PMAs), rely on the inflation of a bladder constrained within a woven sheath which is inextensible in the axis of actuation. The resultant deformation leads to radial expansion and axial contraction; the force that can be applied is proportional to the applied pressure. Related actuators are called pleated pneumatic artificial muscles.

There are "soft" robotic actuators such as shape memory alloys which have been used by Sugiyama et at both as the actuation method and as the main structural component in robots which can both crawl and jump. Another approach, which can be described as "soft" uses a combination of traditional robotic elements (an electric motor) and soft polymeric linkages based on Shape Deposition Manufacturing (SDM). This technique is a combination of 3D printing and milling. An example of a composite of traditional robotics with soft elements has been used with great success in developing robotic grippers comprising soft fingers to improve the speed and efficiency of soft fruit packing in New Zealand.

SUMMARY

New actuation mechanisms for soft robots are described. These and other aspects and embodiments of the disclosure are illustrated and described below.

Certain embodiments describe a robotic device. The robotic device can include a flexible body having a fluid chamber, wherein a portion of the flexible body comprises an elastically extensible material and a portion of the flexible body is strain limiting relative to the elastically extensible material. The robotic device can also include a pressurizing inlet in fluid communication with the fluid chamber, and a pressurizing device in fluid communication with the pressurizing inlet, the pressurizing device comprising a reaction chamber configured to accommodate one or more gas-producing reagents for providing pressurized gas to the pressurizing inlet.

In one aspect, the pressurizing device comprises an electrolytic cell and the reagents are selected to provide a gas product during electrolysis.

In any of the embodiments described herein, the reaction chamber includes a catalyst and a gas-producing reagent, and wherein the reaction chamber is configured for reversible contact of the catalyst and the gas-producing reagent.

In any of the embodiments described herein, the reaction chamber includes a gas-producing reagent selected to provide a gas in a thermal decomposition reaction.

In any of the embodiments described herein, the pressurizing device further comprises a resistive wire in thermal contact with the gas-producing reagent, and wherein the resistive wire is configured to receive electric current.

In any of the embodiments described herein, the gas producing reagent comprises azide salt.

In any of the embodiments described herein, the reaction chamber includes a gas-producing reagent selected to provide a gas in an oxidative decomposition reaction.

In any of the embodiments described herein, the pressurizing device further comprises an oxidizer in contact with the gas-producing reagent.

In any of the embodiments described herein, the pressurizing device is housed in the robotic device.

Certain embodiments describe a soft robotic device. The soft robotic device includes a flexible body having a fluid channel, wherein the flexible body is configured to deform upon pressurization of the fluid channel, a gas inlet in fluid communication with the fluid channel, wherein the gas inlet is configured to receive combustible fluids, and an igniter housed within the fluid channel, capable of initiating combustion of a combustible liquid.

In any of the embodiments described herein, the igniter comprises a pair of electrodes, wherein the pair of electrodes is configured to provide an electric arc.

In any of the embodiments described herein, the soft robotic device includes an on-board storage container comprising a combustible fluid.

In any of the embodiments described herein, the combustible fluid comprises a hydrocarbon.

In any of the embodiments described herein, the soft robotic device includes an oxidizer that supports combustion.

In any of the embodiments described herein, the oxidizer is provided from an on-board storage container or an off-site source or an on-board chemical reactor configured to produce oxygen.

In any of the embodiments described herein, the soft robotic device includes a valve coupled to the fluid channel, wherein the valve is configured to allow fluid communication with the fluid channel when the fluid channel is at a first pressure and to block fluid communication with the fluid channel when the fluid channel is at a second pressure.

In any of the embodiments described herein, the second pressure is higher than the first pressure.

Certain embodiments describe a robotic device. The robotic device includes a flexible molded body, wherein the flexible molded body comprises a fluid chamber disposed within the molded body, wherein a portion of the molded body includes an elastically extensible material and a portion of the molded body is strain limiting relative to the elastically extensible material. The robotic device further includes an elastomer valve disposed at an inlet of the fluid chamber, wherein the elastomer valve is configured to reversibly block fluid communication into or out of the fluid chamber.

In any of the embodiments described herein, the elastomer valve comprises a movable flap that is positionable in a first position to allow fluid communication with the fluid channel when the fluid channel is at a first pressure and positionable in a second position to block fluid communication with the fluid channel when the fluid channel is at a second pressure.

In any of the embodiments described herein, the valve comprises a flexible membrane disposed between a pressurizable fluid and the inlet of the fluid chamber, and the flexible membrane is configured to deform upon pressurization of the pressurizable fluid to block the fluid chamber.

In any of the embodiments described herein, the elastomer valve further comprises a heater, wherein the heater is configured to provide heat to the pressurizable fluid.

In any of the embodiments described herein, the heater comprises a resistive wire that is configured to receive electrical current to provide heat.

In any of the embodiments described herein, the elastomeric valve comprises a flexible chamber disposed between a pair of electromagnets wherein the magnets are capable of moving in and out of a contacting position to reversibly block the fluid chamber.

Certain embodiments describe a method of actuating a robotic device. The method includes providing any of the robotic devices described above, and initiating a reaction in the reaction chamber, wherein the reaction generates a pressurized gas that flows into the fluid chamber of the robotic device to pressurize the device and causes the fluid chamber to deform.

In any of the embodiments described herein, initiating a chemical reaction for providing a pressurized gas comprises reacting hydrogen peroxide in the presence of a catalyst.

In any of the embodiments described herein, initiating the chemical reaction for providing the pressurized gas comprises electrolyzing water to produce hydrogen and oxygen.

In any of the embodiments described herein, initiating a chemical reaction for providing a pressurized gas comprises heating a thermally unstable compound to initiate the gas-producing chemical reaction.

In any of the embodiments described herein, providing the heat includes providing electric current to a resistive wire in the pressurizing device.

In any of the embodiments described herein, initiating a chemical reaction for providing a pressurized gas comprises reacting the azide salt with an reduction agent.

Certain embodiments describe a method of actuating a robotic device. The method includes providing any of the robotic devices described above, providing combustible fluids to the fluid channel, and igniting the combustible fluids to produce a rapidly expanding gas, thereby causing the flexible body to deform.

In any of the embodiments described herein, the combustible fluids includes nebulized liquid hydrocarbon and oxygen.

In any of the embodiments described herein, igniting the combustible fluids comprises providing an electric arc to the combustible fluids.

Certain embodiments describe a robotic device. The robotic device includes a flexible body having a pneumatic chamber and an explosive chamber, wherein the pneumatic chamber is configured to receive pressurized gas and is configured to deform upon receipt of the pressurized gas, and wherein the explosive chamber is configured to receive a fuel. The robotic device also includes a pressurizing inlet in fluid communication with the pneumatic chamber, wherein the pressurizing inlet is configured to receive the pressurized gas for the pneumatic chamber, and an ignition trigger configured to trigger a combustion of the fuel in the explosive chamber, thereby providing explosive gas to the explosive chamber.

In any of the embodiments described herein, the explosive chamber comprises a bellows structure that is configured to stretch upon receiving the explosive gas.

In any of the embodiments described herein, the robotic device further includes a fuel tank configured to carry the fuel for combustion and to provide the fuel to the explosive chamber.

In any of the embodiments described herein, the robotic device further includes a tank for carrying an oxygen source, wherein the tank is configured to decompose the oxygen source to provide oxygen to the explosive chamber.

In any of the embodiments described herein, the tank further comprises a catalyst for decomposing the oxygen source.

In any of the embodiments described herein, the robotic device further includes a pressurizing device for providing pressurized gas to the pneumatic chamber.

In any of the embodiments described herein, the pneumatic chamber is configured to orient the explosive chamber upon receipt of the pressurized gas, and the explosive chamber is configure to provide a jumping motion to the soft robotic system in the orientation provided by the pneumatic chamber, upon the combustion of the fuel.

BRIEF DESCRIPTION OF THE DRAWINGS

The disclosed subject matter is described with reference to the following figures, which are presented for the purpose of illustration only and are not intended to be limiting.

FIGS. 1A-1C illustrate the principle of pneumatic (or hydraulic) actuation in accordance with certain embodiments of the disclosed subject matter.

FIG. 7 illustrates a use of a self-powered chemical pump in accordance with certain embodiments of the disclosed subject matter.

FIG. 8 illustrates using thermal decomposition/oxidation for inflating a gliding robot in accordance with certain embodiments of the disclosed subject matter.

FIGS. 10A-10C illustrate a passive exhaust system in accordance with certain embodiments of the disclosed subject matter.

FIGS. 11A-11B illustrates a jumping tripedal soft robot in accordance with certain embodiments of the disclosed subject matter.

FIGS. 13A-13E show optical micrographs of combustion powered soft robot actuation in accordance with certain embodiments of the disclosed subject matter.

FIGS. 14A-14H show infra-red (IR) images of the tripedal soft robot actuator during a chemical combustion in accordance with certain embodiments of the disclosed subject matter.

FIGS. 17A-17C illustrate an operational principle of an embedded valve in accordance with certain embodiments of the disclosed subject matter.

FIGS. 18A-18B illustrate an electromagnetic valve in accordance with certain embodiments of the disclosed subject matter.

DETAILED DESCRIPTION

Organisms, such as Echinoderms (starfish, sea urchins) and Cnidarians (jellyfish) are ancient and incredibly successful, relatively simple organisms capable of movement unheard of in even the most advanced hard-robotic systems. One major reason for the gap between nature and the state of the art robotic systems is the severe limitation in material selection available for robotics. To bridge this gap between natural and the state of the art robotic systems, robotic systems have exploited different materials. For example, a soft robotic system can use soft materials, such as soft elastomer, or flexible materials, such as papers and a nitrile, to build its structures. A series of parallel chambers embedded within an elastomer are used as a series of repeating components. Stacking and connecting these repeated components provide structures capable of complex motion. In this type of design, complex motion may require only a single pressure source; the appropriate distribution, configuration, and size of the pressurized networks, in combination with a sequence of actuation of specific network elements, determine the resulting movement.

FIGS. 1A-1C illustrate the principle of pneumatic (or hydraulic) actuation in accordance with certain embodiments of the disclosed subject matter. The channel 100 is embedded in a soft rubber (elastomeric) form 102 having a stiffer, yet still pliable backing layer 104. A high elastic modulus is sought for materials used for sections of the network where inflation is undesirable, while a low elastic modulus is used for materials of the network where extensibility is needed. Upon pressurization of the channels via air (pneumatic) or fluid (hydraulic), the soft-elastomer network expands (FIG. 1B). Specifically, when pressurized, channels will expand in the region 106 that is the most extensible. To accommodate the increased volume that results when the canals expand like balloons, the structure bends in response.

The soft-rubber's expansion is accommodated by bending around the stiffer, strain limiting layer (FIG. 1C).

Figure 2:
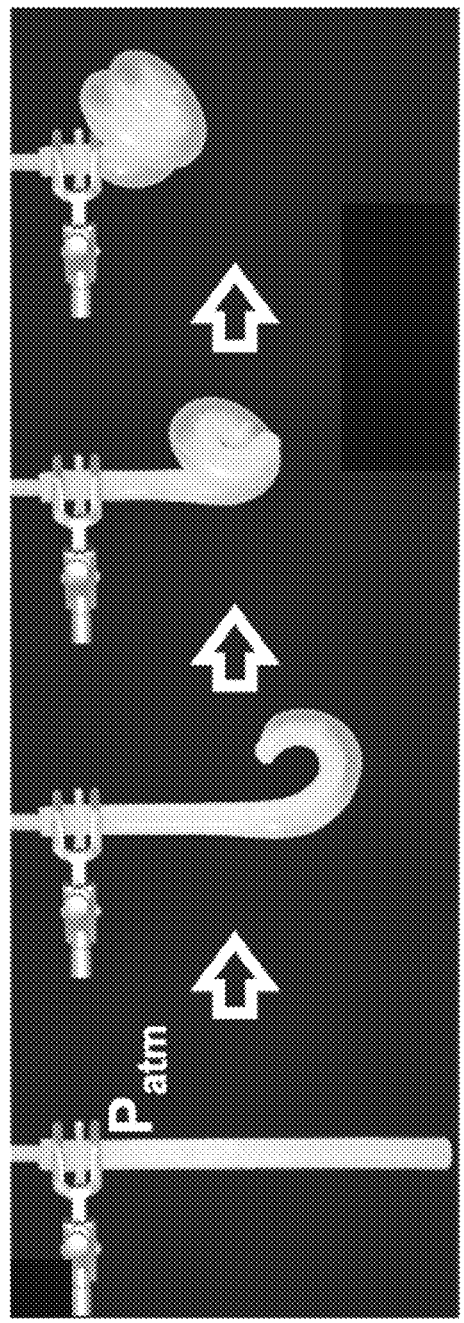
FIG. 2 shows the bending of a soft robot actuator as a function of applied pressure in accordance with certain embodiments of the disclosed subject matter.

The versatility of soft robots is the ability to build complex motions and function by combining modes of pneumatic activation. Modes of pneumatic actuation that provide useful capabilities to soft robots include bending and extending. FIG. 2 shows the bending of a soft robot actuator as a function of applied pressure in accordance with certain embodiments of the disclosed subject matter.

Figure 3:
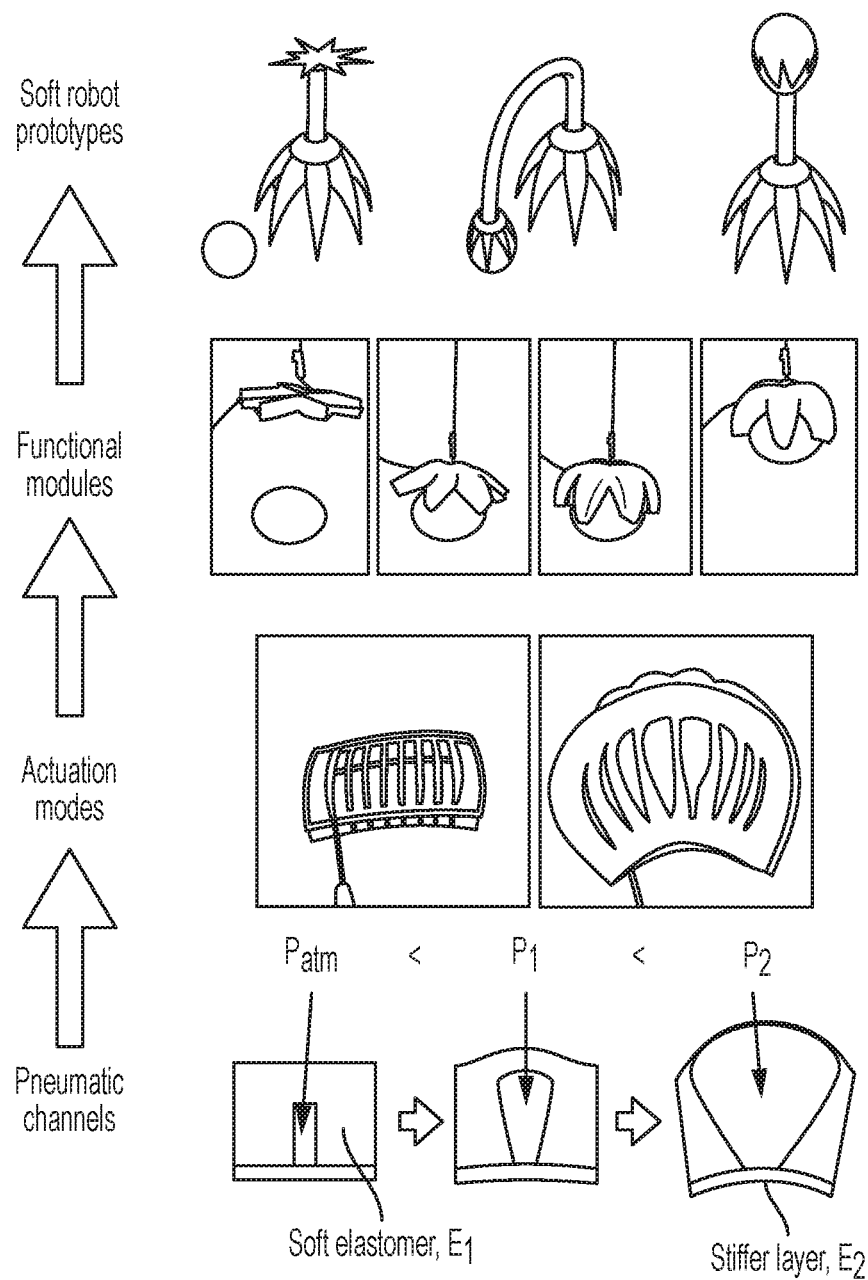
FIG. 3 illustrates the modular design of complex soft robots in accordance with certain embodiments of the disclosed subject matter.

Simple models can be developed that enable these types of actuation. Functional modules are assembled to provide multifunctional soft robot prototypes. Using an approach that focuses on building up from basic capabilities, it is possible to correlate actuation modes and functionalities in terms of application, stability, and ease of control; and build components that can be used in a modular fashion to generate a large number of capabilities. FIG. 3 illustrates the modular design of complex soft robots in accordance with certain embodiments of the disclosed subject matter. Further details regarding the actuating principle of channels or chambers embedded in elastomeric bodies, or various soft robotic systems formed using elastomeric bodies are provided in "Soft robotic actuators," filed on Nov. 21, 2011, identified as International Application Number PCT/US11/61720, by Ilievski et al., which is herein incorporated by reference in its entirety.

The present disclosure relates to providing systems and methods for actuating soft robotic systems. In particular, the disclosed systems and methods provide various mechanisms for providing pressurized gas to soft robotic systems and for actuating soft robotic systems by leveraging characteristics of gas generation principles. Also, the disclosed systems and methods can provide various mechanisms for valving pressurized gas for actuation purposes. The disclosed systems and methods can be sufficiently small and low-weight to enable portable soft robotic systems.

Pressurized Gas Sources

Pneumatic actuation has emerged as a useful strategy in soft robotics. The combination of a network of microchannels (soft robotic actuators) fabricated in organic elastomers, and low-pressure air provides a convenient and simple method of achieving remarkably complex types of movement.

Figure 4:
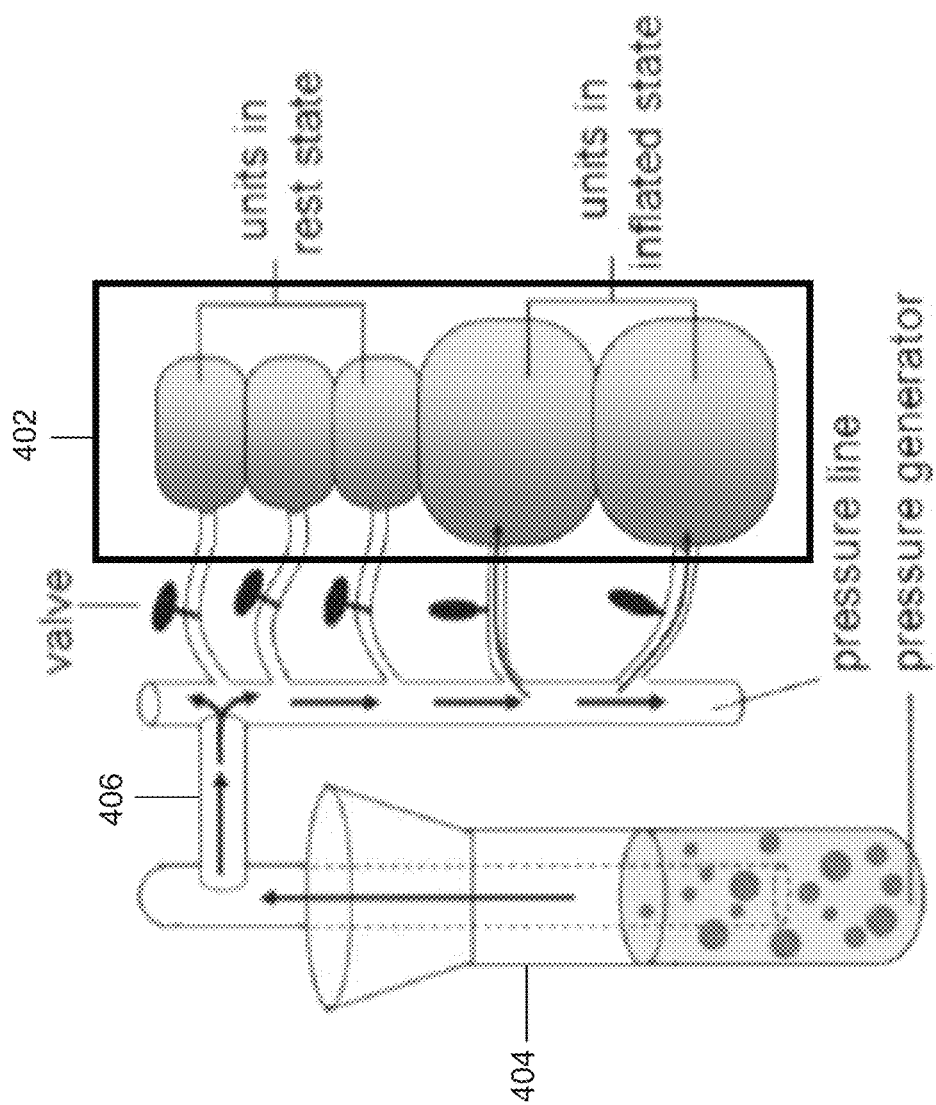
FIG. 4 illustrates a soft robotic system with a pressurized gas source, also known as a gas pump, in accordance with certain embodiments of the disclosed subject matter.

FIG. 4 illustrates a soft robotic system with a pressurized gas source, also known as a gas pump, in accordance with certain embodiments of the disclosed subject matter. FIG. 4 includes a soft robotic system 402 having a plurality of soft robot actuators, a pressurized gas source 404, and a gas channel 406. In this general embodiment, the pressurized gas source 404 can be any source that provides a pressurized gas, such as an air compressor, or a chemical reactor that produces gas. The pressurized gas source 404 can be coupled to a gas channel 406 that leads to multiple channels attached to the plurality of soft robot actuators. The multiple channels attached to the plurality of soft robot actuators can include valves that control the gas flow (direction indicated by black arrows) from the gas channel 406 to associated soft robot actuators. For example, an open valve can provide the pressurized gas to a soft robot actuator and inflate the associated soft robot actuator. However, a closed valve can prevent the pressurized gas from entering the soft robot actuator, thereby maintaining the original pressure state at the soft robot actuator.

Recent advancements in soft-lithography and soft microfluidics can be used to provide a pressurized gas source of a desired size and material compatibility, with the ultimate goal of a 100 mm$^3$ micro-pump that is composed of elastic material, and remains functional under large deformation. In some embodiments, the pressurized gas source can be off-board, e.g., the gas generator is not a part of the robotic system. The off-board pressurized gas source can be coupled to the soft robotic system 402 through a gas tubing. These gas tubings can be meters long without loss of performance. In other embodiments, the pressurized gas source can be on-board, e.g., the gas generator is a part of the robotic system. The on-board pressurized gas generator can include a commercially available pump based on electromagnetic or piezoelectric actuation. In some cases, the on-board gas source can nevertheless be tethered due to, for example, an electrical cord coupled to the gas source. In other cases, the on-board gas source can be untethered. In other embodiments, the pressurized gas generator can be disposable compressed air cylinders.

In one embodiment, the on-board pressurized gas generator can include a microcompressor. The design can be miniaturized to better fit the soft robot(s). In some cases, the microcompressor can be a reciprocating diaphragm micropumps such as those available from Takasao Electronics, e.g., SDMP302 standard series piezoelectric micropump, with the smallest device in the order of 3000 mm$^3$. These piezoelectrically actuated micropumps use less than a Watt of power to produce ~1 mL/min air flow at ~1 kPa. In some embodiments, the microcompressor can have a volume of 5×5×25 millimeters, and use 1 Watt of power to produce ~1 mL/min pump flow with ~1 kPa pressure.

Figure 5:
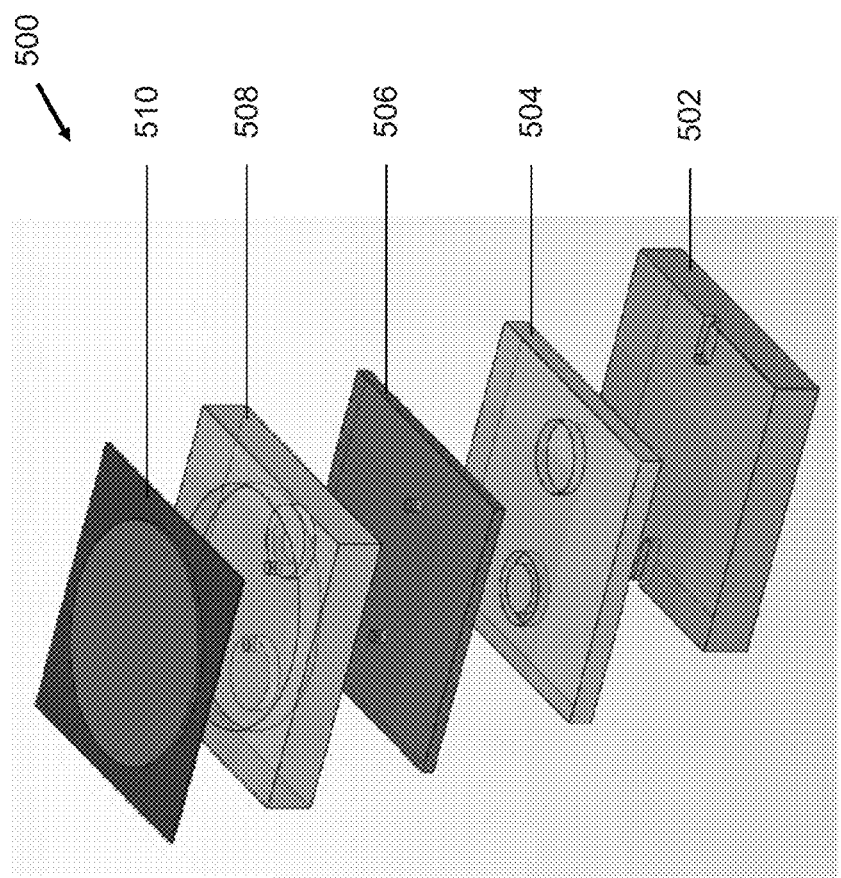
FIG. 5 illustrates a soft microcompressor in accordance with certain embodiments of the disclosed subject matter.

In some embodiments, the microcompressor can be a soft micropump that incorporates existing reciprocating diaphragm technologies into an embedded elastomer. Soft micropumps can be provided on a smaller scale. In one or more embodiments, a soft microcompressor having a volume of 100 mm$^3$ can be fabricated. FIG. 5 illustrates a soft microcompressor in accordance with certain embodiments of the disclosed subject matter. The illustrated soft microcompressor 500 has a dimension of is about 12 mm×12 mm×6 mm. The complete system 500 is assembled by bonding pre-patterned layers of silicone and polyurethane elastomers. The microcompressor 500 includes a silicone rubber base 502, a bottom layer of a polyurethane valve 504, a polyester valve membrane 506, a top layer of the polyurethane valve 508, and an actuator 510. These layers collectively form a diaphragm pump, inlet and outlet membrane valves, and micro air channels. The only rigid component in the assembly is the electrically powered actuator used to pump the air chamber. This design is adapted from the micropump presented in the work by Bohm et al. (*Sensor and Actuators A: Physical* 77(3):223-228 (1999)), which was shown to produce an air flow of 20 mL/min with ~10 kPa pressure. As show in FIG. 5, microchannels are patterned into a silicone rubber base that is bonded to a membrane valve composed of three polyurethane layers. The top of the valve is covered by an electrically powered actuator 510. The actuator 510 can include a PZT disk (also known as a lead zirconate titanate disk), an electromagnetic solenoid, or a dielectric elastomer actuator (DEA). The current design is distinguished from the work by Bohm et al. by the emphasis on elastic materials and soft-lithography fabrication, which allow the micropump to remain functional when elastically deformed. The later feature provides distinct advantages for on-board actuators in which the soft robot body can undergo significant deformation during operation.

Figure 6:
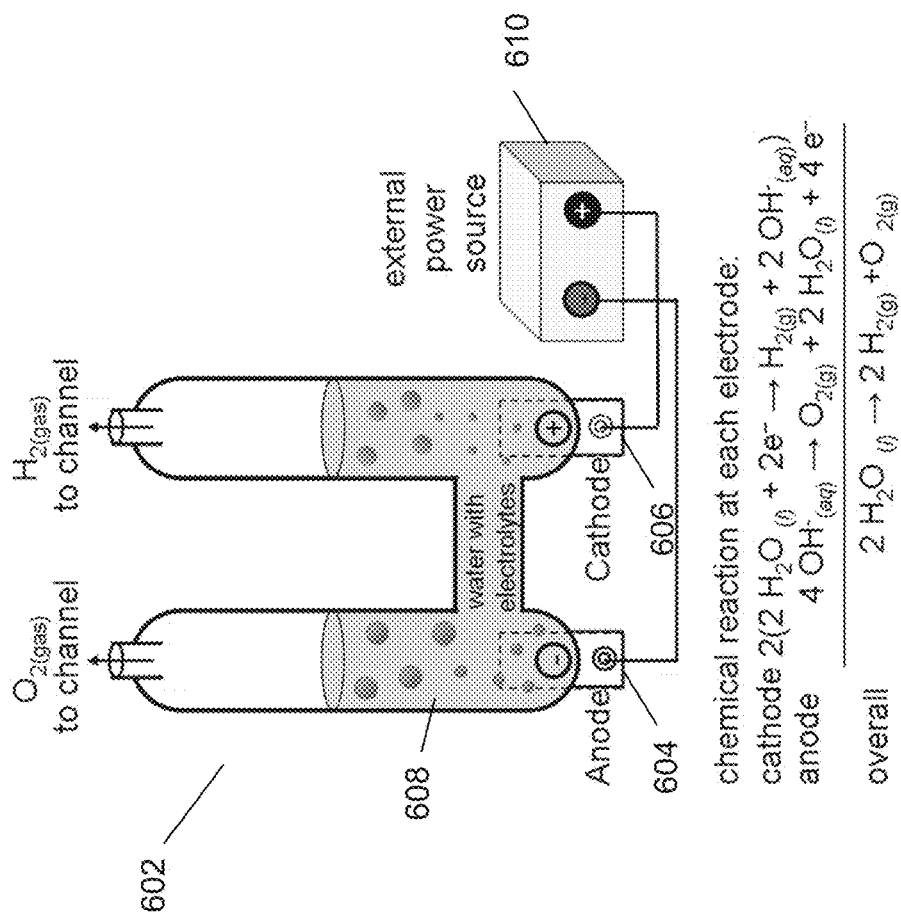
FIG. 6 illustrates an electrolyzer and the chemistry used to generate pressurized gas in accordance with certain embodiments of the disclosed subject matter.

In another embodiment, the on-board pressurized gas generator can include an on-board electrolyzer. FIG. 6 illustrates an electrolyzer and the chemistry used to generate pressurized gas in accordance with certain embodiments of the disclosed subject matter. The on-board electrolyzer can be powered using off-board electrical power, and can use water to generate gas. In other embodiments, it can be powered using a battery power supply, which permits on-board operation. The electrolyzer 602 includes an anode 604 and a cathode 606. Two electrodes are partially immersed in an aqueous solution of ionic salts 608 contained in a vessel of two interconnected tubes. By way of example, other gases and reaction chemistries are contemplated. When the electrolyzer 602 receives electricity from an electrical source 610, oxygen is generated from the negative electrode (anode), while hydrogen is generated from the positive (cathode.) Each tube can be connected to the channels of the soft robot to facilitate inflation. Every mole of water (18 grams) can produce 1.5 mole of gas (~33.6 liters under ambient conditions), or roughly 1800 times expansion in volume. The electrolyzer 602 can generate gas (hydrogen and oxygen) at the rate ~5 mL/min. Improved performance is possible by increasing voltage applied, the surface area of the electrodes, the conductivity of the aqueous solution, and combination of the above.

In other embodiments, the on-board pressurized gas generator can include a self-powered chemical pump. The microcompressor and the water electrolyzer can require an external electric power source, which would be provided through an electronic cable tether to the soft robotic system. Though tethered robots will suit many important applications, an untethered design would provide greater mission flexibility. One solution to providing an untethered robotic system is to use a small diesel engine to provide the pressurized gas and the electrical power. This solution may be appropriate for larger soft robotic systems. To make the pump self-powered and thereby eliminate the necessity to tether the robots, a soft, self-contained and self-powered pump can be employed.

FIG. 7 illustrates a use of a self-powered chemical pump in accordance with certain embodiments of the disclosed subject matter. FIG. 7 includes a self-powered chemical pump 702 and a soft robotic system 704. The pump 702 can be made only with soft material. The pump 702 generates pressurized gas by catalyzed decomposition of a reagent. The reagent can include hydrogen peroxide. The pump 702 can be self-regulated by a built-in negative feedback mechanism. The catalyst can be physically tethered to the soft cap and is allowed to contact the hydrogen peroxide solution. The catalyst can include transition metal compounds, such as silver-coated mesh, manganese dioxide power, and/or manganese powder. Oxygen is produced at the interface of the liquid and the catalyst. Once the pressure starts to build up inside the chamber, the cap expands such that the catalyst is displaced from its resting position and physically separates from the hydrogen peroxide solution. The gas generating reaction then slows down due to the reduced contact area between the liquid and the catalyst. As the pressure is reduced (due to fluctuations in chamber conditions, slow leaks, etc.), the chamber contracts, thereby increasing catalyst contact with the reactive solution and increasing gas evolution, In this way, the pressure reached an equilibrium steady state. In some embodiments, the catalyst can include a silver-coated mesh. When the pressure buildup is high enough, the pump 702 can drive the soft robotic system 704. The pump 702 recharges itself automatically, and maintains the pressure under a steady state. Such a pump 702 can produce stable pressure as high as 22 psi, and be capable of driving the locomotion of a pneumatic rolling belt 704, as illustrated in FIG. 7.

Explosive Actuation

In some applications, some soft robots may be infrequently actuated. Such robots can include, for example, a toppled robot that can be triggered to stand up-right, or a glider that can be inflated from a folded configuration into an extended (flying) configuration. To provide actuation to infrequently-actuated robots over a long period of time, an explosive gas producing mechanism can be used. In certain embodiments, an explosive gas producing mechanism is used to provide pressure to pneumatic networks. The explosive gas producing mechanism can include decomposition/oxidation of a reagent. An exemplary reagent includes an azide salt, such as sodium azide, $NaN_3$, and cesium azide and the like. For example, oxidation of two moles of solid sodium azide, $NaN_3$, can produce three moles of gaseous $N_2$, which results in a huge increase in volume. By confining $N_2$ gas to the pneumatic networks, the pneumatic networks can be actuated. The reagent can also include a mild oxidizer. The mild oxidizer can include one or more of potassium nitrate and potassium dichromate at suitable concentrations, e.g., 0.1-20 wt % or about 10 wt %. The gas producing mechanism can include using a catalyst. The catalyst can include transition metal compounds. The transition metal compounds can include silver, manganese, or manganese dioxide.

In certain embodiments, pneumatic channels in infrequently actuated robots can include a reagent and a resistive wire. As discussed above, the reagent can include an azide salt, such as sodium azide. When the resistive wire is provided with electric current, the resistive wire produces heat. This heat increases the ambience temperature and heats the sodium azide, e.g., to an oxidation initiating temperature of above 300 degrees Celsius. The heated sodium azide can be oxidized and produce gaseous $N_2$, thereby producing pressure to actuate the pneumatic channels.

In certain embodiments, thermal decomposition/oxidation of sodium azide can be used inside a coiled actuator to inflate a gliding robot. FIG. 8 illustrates using thermal decomposition/oxidation for inflating a gliding robot in accordance with certain embodiments of the disclosed subject matter. This gliding robot can be untethered and thrown. In certain embodiments, thermal decomposition/oxidation of sodium azide can be useful in actuators that extend upon pressurization.

Explosive Combustion Actuation

Despite the advantage of soft robotic actuators, soft robotic actuators have a disadvantage that they do not lend themselves well to rapid actuation, in part because compressed air is typically supplied through a tube from an external source, and viscous losses due to the tube can limit the rate at which pressurized gas can be transported.

In one or more embodiments, pressure is supplied to soft robotic actuators simply and rapidly mixing combustible fluids, and generating bursts of pressure by igniting these combustible fluids in the soft robotic actuators. In one embodiment, the combustible fluids can include nebulized liquid hydrocarbon and oxygen. In another embodiment, the combustible fluids can include hydrocarbon and oxygen. The hydrocarbon can include one of methane, butane, propane, and acetylene.

Explosive combustion is a highly efficient method of generating power (for example, in the cylinder of a diesel or spark ignited engine); however, it has not been exploited to generate power in soft material systems. Integration of explosive combustion, gas expansion at high temperature, and expansion of a soft robotic actuator represents an attractive method for rapid activation in soft robots. The deformation of elastomers will allow collocated power generation and actuation. The integration of power generation and actuation into a single device also reduces losses from friction, and increases energy efficiency in applications from locomotion to manipulation.

A method of actuating soft robots includes fuel combustion, thereby allowing untethered soft robot actuation. For example, combustible fluids can be flowed into a soft robot actuator. The combustion fluids can include an input fuel and a reduction agent. The input fuel can include hydrocarbon materials. The hydrocarbon material can include methane, butane, or acetylene. The reduction agent can include an oxidizer, such as oxygen. The oxidation of the input fuel can then be triggered with an external trigger. The external trigger can include an electric arc, spark, or any other suitable ignition triggers. The result is an explosive reaction that rapidly actuates the soft robotic actuator, typically in less than 0.1 s. Pressurization of the soft robotic actuator is primarily due to the heat expanding the gas, as opposed to an increase in the number of gas molecules. The silicone walls then absorb the heat in the gas, depressurizing the soft robotic actuator. Soft lithography fabrication has proven robust to many, repeated actuation sequences (at least >20).

Figure 9:
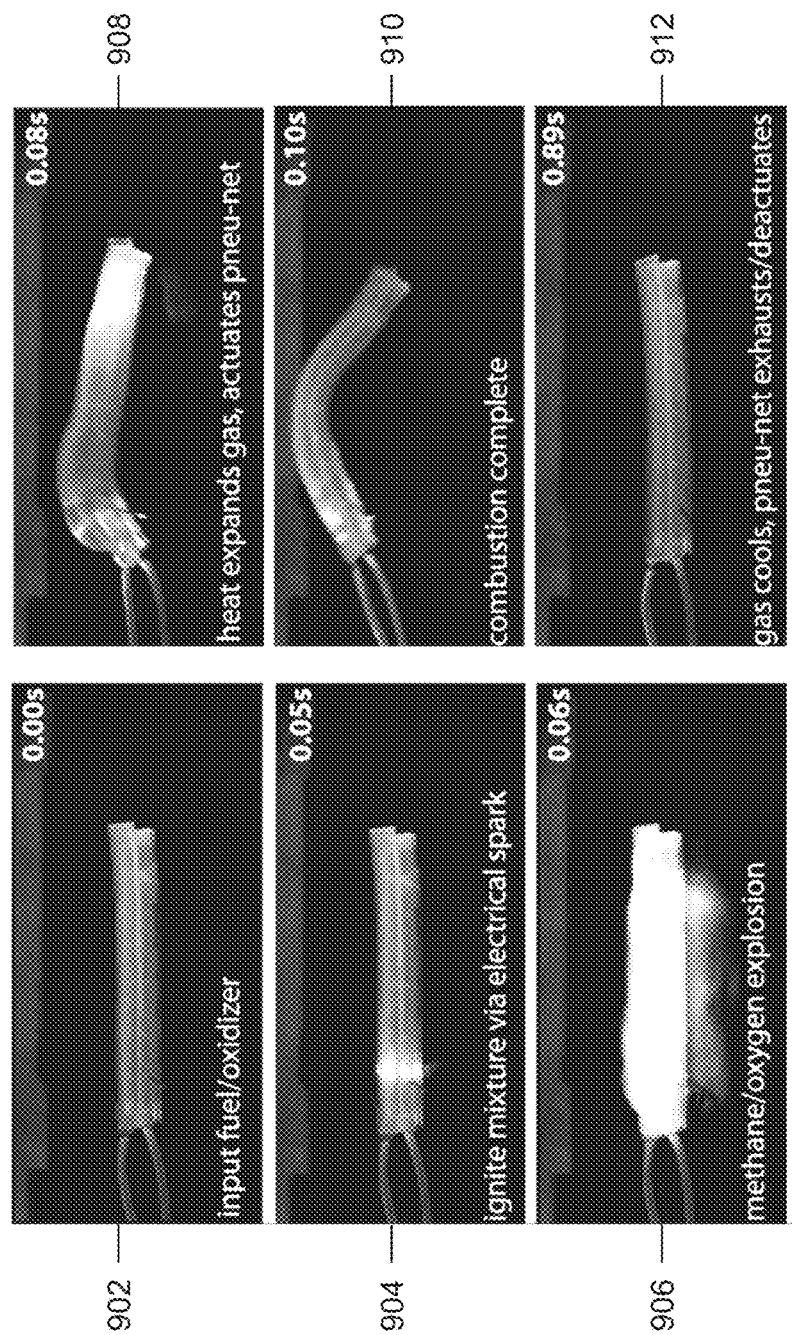
FIG. 9 shows a time lapse photo series illustrating the actuation of a soft robot using explosive action of combustion in accordance with certain embodiments of the disclosed subject matter.

FIG. 9 shows a time lapse photo series illustrating the actuation of a soft robot using explosive action of combustion in accordance with certain embodiments of the disclosed subject matter. In 902, a soft robot is at a resting state with an input fuel and a reduction agent. The soft robot can be pneumatically sealed before the start of a chemical combustion. In 904, an external trigger ignites the mixture of the input fuel and the reduction agent to trigger the chemical combustion. In 906, the chemical combustion explodes the input fuel and the reduction agent. In 908, the generated methane and the oxygen undergoes expansion, thereby actuating the actuator. In 910-912, once the combustion is complete, the gas in the actuator cools, which reduces the volume of gas, thereby de-actuating the actuator. In some cases, the actuator can be pneumatically unsealed to remove the gas in the actuator, thereby de-actuating the actuator quickly.

One of the advantages of using chemical combustion is that the actuation of the soft robot actuator requires much less amount of gas per actuation relative to compressed air (<2% by volume.) In particular, if butane is used as an input fuel, an on-board liquid storage could provide long period of operation without a tether.

In the combustion of gas fuels, typically the moles of reactant exceed the moles of product. The decrease in the moles of product can provide a passive exhaust system that allows a continuous operation of an actuator. FIGS. 10A-10C illustrate a passive exhaust system in accordance with certain embodiments of the disclosed subject matter. The passive exhaust system can include two flaps located at an inlet of a chamber. The passive exhaust system can automatically shut the flaps under a high pressure environment of the explosion and open the flaps as the gas cools and the interior pressure lessens. As illustrated in FIG. 10A, the passive exhaust system can include an outer shell 1002 forming a chamber in a soft robot, a via 1004 that couples the soft robot's internal chamber with another pneumatic channel (or other outlet), and flaps 1006 that are incorporated into the internal chamber of the soft robot. As illustrated in FIG. 10B, the flaps 1006 are configured to close during the explosion to thereby seal the chamber, allowing the system to pressurize. As illustrated in FIG. 10C, once the gas cools, the gases contract and the internal pressure drops and the flaps 1006 are configured to open, allowing the exhaust (e.g., $CO_2$) to leave the actuator.

The explosive actuators can be useful for providing movements with large magnitudes. The explosive actuators can also be useful for providing fast motion for jumping or running robots, prosthetics, or exoskeletons. Furthermore, the explosive actuators can also allow soft robots to use combustion as a power source. Combustion of fuels, such as hydrocarbons, can be efficient. Furthermore, combustion of fuels can generate a large amount of energy. These characteristics can be useful for long range, untethered operations for a prolonged period of time.

In some embodiments, explosions are used to actuate a jumping soft robot. Explosive reactions produce rapidly expanding gas; explosive combustion is used to demonstrate a mobile robot with a fast motion—jumping. FIGS. 11A-11B illustrates a jumping tripedal soft robot in accordance with certain embodiments of the disclosed subject matter. FIG. 11A illustrates a schematic, including dimensions, of a tripedal soft robot. The tripedal soft robot 1100 includes three legs 1102a-1102c that each contains a separately-operable explosion-based actuator. Each leg can include a passive valve system, as disclosed in FIG. 10A-10C. As shown in the exploded view of FIG. 11A, the passive valve system 1104 allows low pressure (P1) gas to flow out the exhaust vents in the soft robotic actuator. However, the passive valve system 1104 blocks high pressure (P2) gas from flowing out the exhaust vents. Exemplary dimensions for the tripedal soft robotic are also shown in FIG. 11A. In some embodiments, the passive valve system 1104 can be identical to the passive valve system illustrated in FIG. 10A-10C. In other embodiments, the passive valve system 1104 can include a different configuration of a flap, as illustrated in FIG. 11A. The passive valve system 1104 of FIG. 11A is a single-flap based valve system. The single flap can be open at a low pressure to provide a pneumatic passage, but the single flap can be closed upon a high pressure pneumatic flow.

In some embodiments, the legs 1102a-1102c can be actuated using electrical spark triggered explosion, for example, an explosion of a methane-oxygen mixture. An electrical spark for ignition can be used because it is fast, easily incorporated into soft robots, and flexibly controlled in timing. FIG. 11B illustrates a tripod soft robot with electrical inputs for spark ignition to explosively actuate the soft robotic actuators. The electrical inputs can include a common ground wire 1106 provided to each of the soft robotic actuator channels, and a metal wire 1108 that can provide high voltage. In some embodiments, the common ground wire 1108 can be threaded through all three soft robotic actuators of the tripod. The tripod soft robot can also receive a tubing that is configured to feed an input fuel and a reduction agent into the soft robotic actuators. In some cases, this tubing can be sheathed over the metal wire 1108 that provides high voltage. In other words, the metal wire 1108 can be lead coaxially through the gas delivery tubes.

In some embodiments, mass flow controllers can be used to regulate introduction of the input fuel and the reduction agents into the actuators. In one exemplary embodiment, each leg can receive methane at a rate of 4 ml/min and oxygen at a rate of 8 ml/min; however, the exact flow rates will depend on the size of the soft robotic and the composition of the fuel and reduction agents. When all legs of the tripod are actuated simultaneously, the soft robot can jump more than 30 times its height in less than 0.2 s. Differential timing of explosive actuation in the independent soft robotic actuators causes directed locomotion.

In some embodiments, the input fuel for the explosive combustion is preferably methane, any fuels that provides exothermic oxidation, or any combinations thereof. For example, methane can be an attractive input fuel because its exothermic oxidation provides enough energy (891 kJ/mol) to actuate a soft robotic actuator via thermally driven gas expansion.

In some embodiments, the input fuel for the explosive combustion is preferably a fuel that limits residues after combustion. For example, a stoichiometric mixture of gas (1 mole $CH_4$:2 moles $O_2$) can be an attractive input fuel because the explosion of a stoichiometric mixture of gas is a soot-less reaction. The clean combustion can largely eliminate carbon deposition within the soft robotic actuators, and allow multiple actuations without contamination or clogging. The explosion can be fast and the heat generated can be quickly dissipated. With enough time between actuations, the soft robotic actuator can remain at a safe temperature and can be safe to touch during actuation.

In some embodiments, soft robotic actuators can rapidly dissipate the high temperature generated in combustion (~1300° C.) and from electrical arcs (>3000° C.) Elastomeric robots, fabricated using soft lithography, are robust to tensile forces caused by the explosive actuation.

In some embodiments, a soft robotic actuator that uses explosive combustion as actuation means can be fabricated using soft lithography. In some cases, an elastomer for the soft robotic actuator can be a stiff silicone rubber. The stiff silicone rubber can include Dragon Skin 10 or DS-10 from Smooth-on, Inc. The stiff silicone rubber can have a greater Young's modulus than previous choices for pneumatic actuation, including Ecoflex 00-30 from Smooth-on, Inc. The stiff silicone rubber can permit the soft robotic actuators to withstand large forces generated within channels during explosion. For example, explosive combustion would generate an instantaneous pressure of 150 PSI (lbs/sq in) immediately after the explosion in a solid container. While the instantaneous pressure in the soft robotic actuators would be lower than 150 PSI because the soft actuators can deform, nevertheless the instantaneous pressure in the soft robotic actuators can be quite high. The stiff silicone rubber can withstand such high instantaneous pressure. A high Young's modulus can also allow the soft robotic actuators to release stored elastic energy rapidly for propulsion.

Figure 12A:
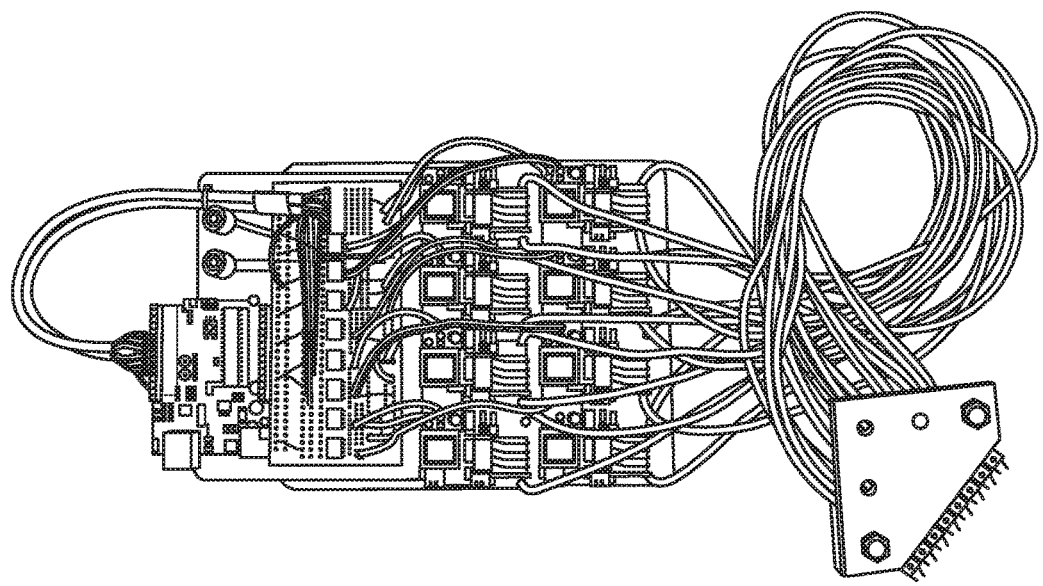
FIGS. 12A-12B illustrate a capacitive discharge ignition module in accordance with certain embodiments of the disclosed subject matter.
Figure 12B:
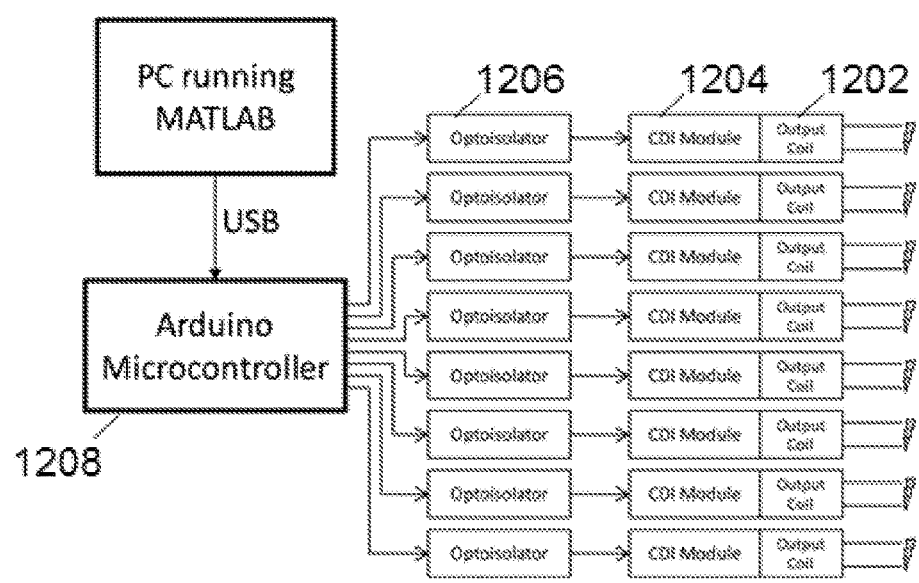
Figure 14A:
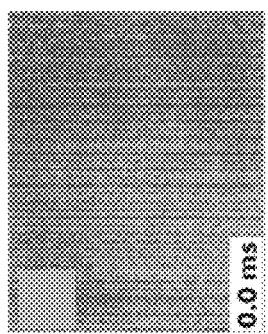
Figure 14B:
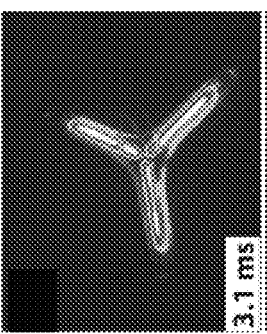
Figure 14C:
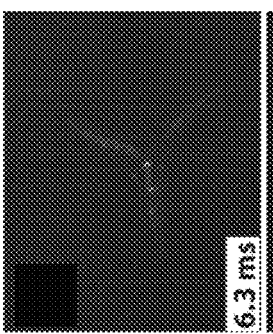
Figure 14D:
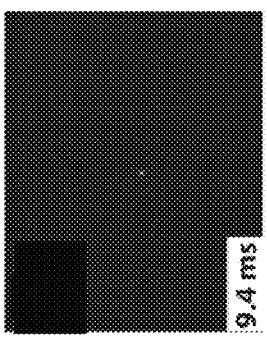

In some embodiments, the external trigger for the combustion reaction can be provided using capacitive discharge ignition modules, for example those that are commercially available such as from Arduino or readily adaptable from radio control units. In one exemplary embodiment, the capacitive discharge ignition modules was adopted from a module from a hobby Radio Control (RC) airplane industry. FIGS. 12A-12B illustrate a capacitive discharge ignition module in accordance with certain embodiments of the disclosed subject matter. FIG. 12A shows a photograph of the capacitive discharge ignition module and FIG. 12B shows a schematic diagram of the capacitive discharge ignition module. The capacitive discharge module can include an output coil 1202, a capacitor discharge ignition (CDI) module 1204, an opto-isolator 1206, and a microcontroller 1208. The capacitive discharge module can be controlled using a computing system. The capacitive discharge module can be used to generate electrical arcs using high voltages (~6.6 kV at 2 mm electrode separation.)

The soft robotic actuators fabricated in DS-10 silicone rubber withstood multiple (>30) explosive actuations without failure. FIGS. 13A-13E show time-sequenced optical micrographs of combustion powered soft robot actuation in accordance with certain embodiments of the disclosed subject matter. FIG. 13A shows one leg of a tripedal soft robot actuator undergoing an explosive combustion over time. At 0.0 ms, an electrical arc triggers an explosive combustion of methane with a visible flame that persists for 10.3 milliseconds. At 7.1 milliseconds, a soft valve prevents propagation of the flame and pressure wave during the explosion. After about 50 milliseconds, the stored elastic energy stretches the soft robotic actuator.

FIG. 13B shows a side view of the tripedal soft robot actuator before a chemical combustion and FIG. 13C shows a side view of the tripedal soft robot actuator after a chemical combustion. FIG. 13C shows a side view of the tripedal soft robot actuator during a chemical combustion. The flame front can propagate to the end of the soft robotic actuators and, as shown in FIG. 13E, the stored elastic energy is released as a downward motion. The dashed line shows the angle of deflection of the robot's feet, at rest, whereas the solid line shows the angle of deflection of the robot under explosive actuation. The scale bar is 2 cm.

The stiffer soft robotic actuators and explosive power generation result in reduced actuation amplitudes, as evidenced in FIG. 13B-13E. The arc trigger and resulting explosions occurred in less than 5.0 milliseconds. While flame persisted for <5.0 milliseconds, the soft robotic actuators radiated thermal energy for ~10 milliseconds, as evidenced in infra-red (IR) images. FIGS. 14A-14H show IR images of the tripedal soft robot actuator during a chemical combustion in accordance with certain embodiments of the disclosed subject matter. In particular, FIGS. 14A-14D show IR images of the tripedal soft robot actuator in which all three legs in the tripedal soft robot actuator are simultaneously ignited. The all three legs have an IR signature below 510° C. for 6.3 milliseconds; after 9.4 milliseconds, the temperature of the robot is below 340° C. On the other hand, FIGS. 14E-14H show infra-red images of the tripedal soft robot actuator in which legs are sequentially actuated with 15 ms delay between actuations. In this case, only one of the legs has a temperature greater than 340° C. at a time.

Figure 15:
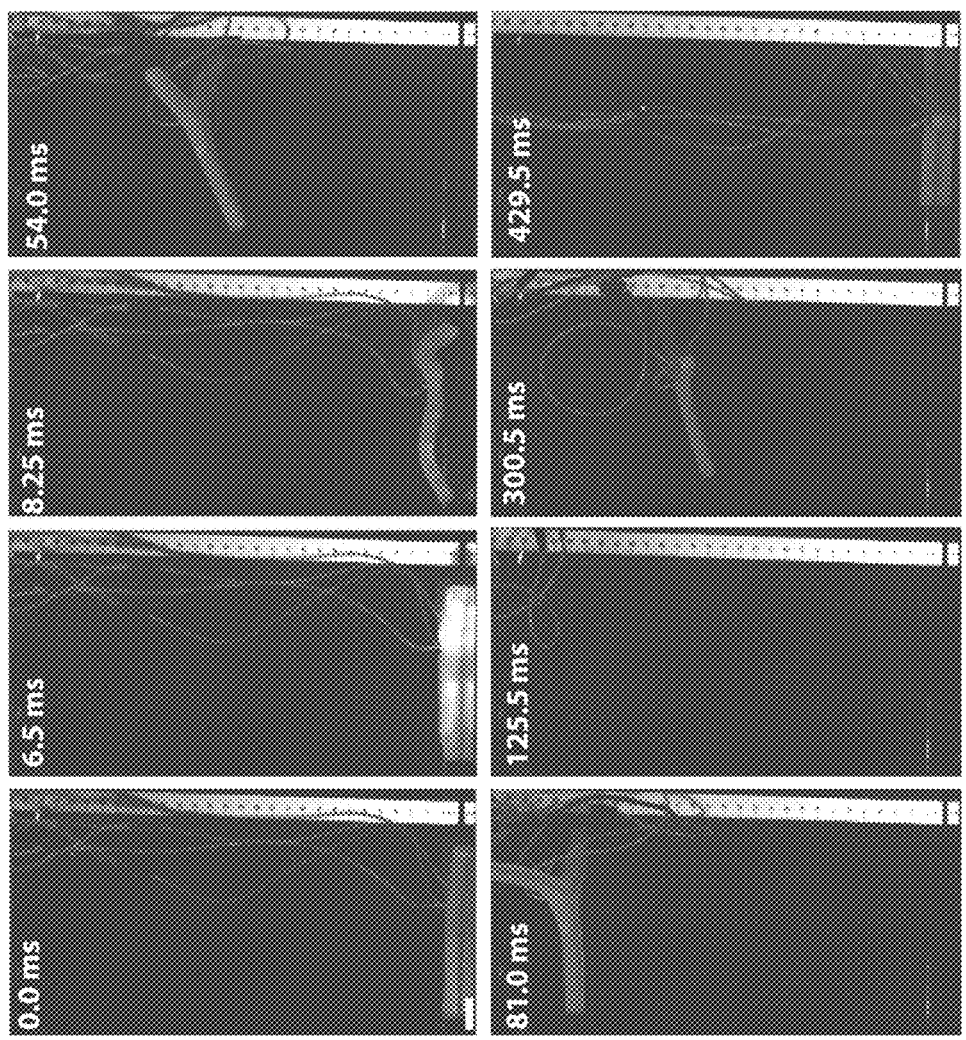
FIG. 15 shows a time sequence of a jumping tripedal soft robot actuator in accordance with certain embodiments of the disclosed subject matter.

FIG. 15 shows a time sequence of a jumping tripedal soft robot actuator in accordance with certain embodiments of the disclosed subject matter. In this case, the legs in the tripedal soft robot actuator were simultaneously actuated. Ignition of all three channels begins at 6.5 milliseconds. The robot leaps from the ground at 8.3 milliseconds and exceeds 30 cm height after 125.5 milliseconds (the ruler is 30 cm tall.) Notice that the tripedal soft robotic actuator jumped greater than 30 times its body height in under 0.2 s.

In some embodiments, legs in a soft robotic actuator can be actuated in a predetermined sequence to provide a complex motion. FIGS. 16A-16J illustrate a complex motion of a soft robotic actuator in accordance with certain embodiments of the disclosed subject matter. In this example, legs in the soft robotic actuator are actuated in a predetermined sequence to jump onto a glass plate. For example, the rear leg of the soft robotic actuator is actuated 5 milliseconds prior to the simultaneous actuation of the two front legs of the soft robotic actuators. This causes the robot to provide a forward jump motion and causes the robot to jump onto a glass plate, elevated 3 cm above the ground.

Figure 16A:
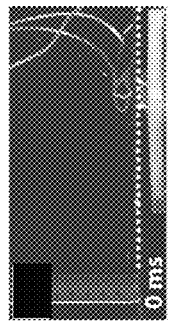
FIGS. 16A-16J show a sequence of images illustrating how a tripedal soft robot actuator jumps onto a glass plate elevated 3 cm off of the ground in accordance with certain embodiments of the disclosed subject matter.
Figure 16B:
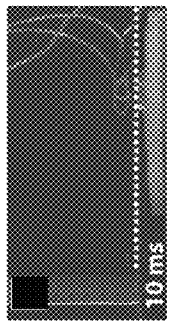
Figure 16C:
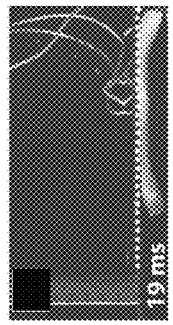
Figure 16D:
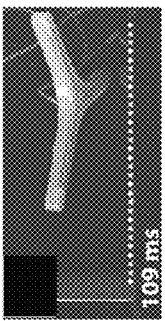
Figure 16E:
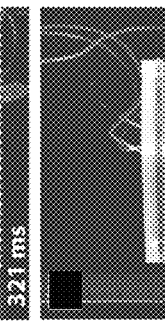
Figure 16F:
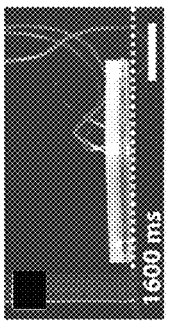
Figure 16G:
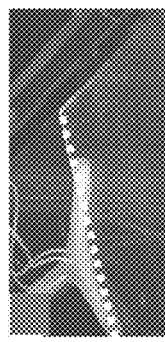
Figure 16H:
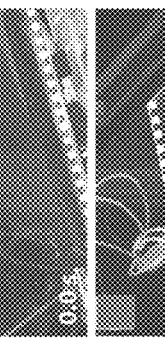
Figure 16I:
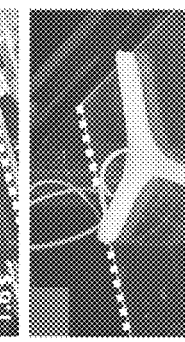
Figure 16J:
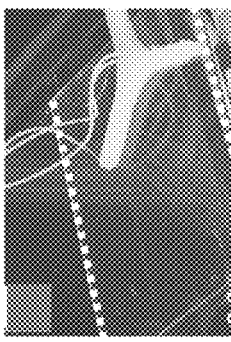

FIGS. 16A-16D show a sequence of images illustrating how a tripedal soft robot actuator jumps onto a glass plate elevated 3 cm off of the ground in accordance with certain embodiments of the disclosed subject matter. In FIGS. 16A-16B, an actuation of the rear leg, followed by an actuation of the two front legs of the tripedal soft robotic actuator, caused the robot to leap onto the glass plate. The delay between the rear leg actuation and the front leg actuation was 5 milliseconds. In FIG. 16C-16D, further sequential actuation of the rear leg and the two front legs of the soft robotic actuator caused the robot to jump along the elevated glass plate. FIGS. 16E-16J show a side view illustrating how the tripedal soft robot actuator jumps onto a glass plate elevated 3 cm off of the ground. In FIG. 16F, 5 milliseconds after the actuation of the rear leg of the soft robotic actuator, two front legs of the soft robotic actuators are actuated. In FIGS. 16G-16Ii, the soft robotic actuator leaps forward and, in FIG. 16J, the soft robotic actuator falls onto the elevated glass plate. Dashed white lines indicate the extents of the glass plate and the scale bars are 4 cm.

Embedded Valves

Pneumatic flow control can be accomplished with millimeter-scale valves. Multilayer soft lithography can used to embed an elastomer sheet with pneumatically or thermally actuated valves. FIGS. 17A-17C illustrate an operational principle of an embedded valve in accordance with certain embodiments of the disclosed subject matter. The embedded valve system can include a gas channel 1702, a control channel 1704, a heater 1706, and a cooler 1708. The heater 1706 and the cooler 1708 are configured to heat or cool the fluid in the control channel 1704. The heater 1706 can include a resistor. The resistor can be formed using nickel chromium. The resistor would generate heat as current is passed through the resistor. In some embodiments, the heater 1706 and the cooler 1708 can be formed using a single unit. The single unit can include a peltier cooler that uses the thermoelectric effect. When current is passed through the peltier cooler, the cooler 1708 could be cooled on one side, whereas the other side of the cooler would heat up.

As illustrated in FIG. 17A, when the fluid in the control channel 1704 is cool, then the gas channel 1702 is free to pass pressurized gas. As illustrated in FIG. 17B, when the heater 1706 heats up the fluid in the control channel 1704, the control channel 1704 expands, thereby blocking the gas channel 1702. This blocks the pneumatic flow through the gas channel 1702. As illustrated in FIG. 17C, when the cooler 1708 is turned on to cool the fluid in the control channel 1704, the control channel shrinks, thereby opening up the blockage in the gas channel 1702. Therefore, the gas channel 1702 is free to pass pressurized gas. In summary, pressurized expansion in a control channel induces elastic deformation in neighboring channels; the neighboring channel completely closes when >40 kPa is applied to the control channel.

In some embodiments, soft valves and pumps can be activated by soft embedded electromagnets. FIGS. 18A-18B illustrate an electromagnetic valve in accordance with certain embodiments of the disclosed subject matter. The electromagnetic valve can include two electromagnets 1802 positioned across a pneumatic chamber 1804. In some cases, the electromagnets 1802 can be embedded in the elastomer 1806. The electromagnets 1802 can include solenoids or inductors. The inductors can include a spirally wound conductor, such as planar spirals of conductive liquid eGaIn microchannels. The electromagnets 1802 can also include an electromagnet core. The electromagnet core can be formed using magnetorheological fluid (MR fluid) or nickel-iron alloy microparticles.

When the electromagnets 1802 induce the magnetic field, the electromagnets 1802 can stretch or compress the elastomer sandwiched between the two electromagnets, depending on whether the electromagnets 1802 attract or repulse each other. Elastic deformation would then control the opening and closing of the pneumatic chamber 1804.

In some embodiments, the electromagnets 1802 can operate as a pneumatic pump. FIG. 18A illustrates how a magnetic repulsion of the electromagnets 1802 can inhale air through an input soft valve 1808 into the pneumatic chamber 1804. In FIG. 18A, the electromagnets 1802 are activated to exhibit the same polarity. Therefore, the electromagnets 1802 are repelled from one another. The magnetic repulsion of the electromagnets 1802 generates a void (i.e., a pneumatic chamber) in the elastomer, which is subsequently filled with air received via the input soft valve 1808. Once the air is inhaled, the input soft valve 1808 blocks the air from leaking out. The inhaled air can be provided to other parts of the soft robotic actuator.

FIG. 18B illustrates how a magnetic attraction of the electromagnets 1802 can pump out the inhaled air through an output soft valve 1810. In FIG. 18B, the electromagnets 1802 are activated to exhibit the opposite polarity. Therefore, the electromagnets 1802 are attracted to one another. The magnetic attraction of the electromagnets 1802 can squeeze the pneumatic chamber 1804, thereby driving out the inhaled air via the output valve 1810. Once the inhaled air is squeezed out, the output soft valve 1810 can block the exhaled gas from returning to the pneumatic chamber 1804. The soft embedded electromagnets can be controlled with about one watt of power.

Figure 19A:
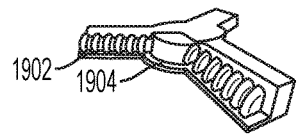
FIGS. 19A-19G illustrate a soft robot with an on-board actuation system in accordance with certain embodiments of the disclosed subject matter.

In one or more embodiments, aspects of the present disclosure can be combined to provide a soft robotic capable of complex motions. FIGS. 19A-19G illustrate an untethered soft robot with an on-board actuation system in accordance with certain embodiments of the disclosed subject matter. The disclosed soft robot can provide directional jumping motions using a combination of pneumatic and explosive actuators. This robot can includes a plurality of pneumatic actuators and a central explosive actuator. In this exemplary case, the robot was approximately 8 cm in height with a 15 cm radius. The pneumatic actuator can be a part of a robotic body that also includes a control system 1904, as shown in FIG. 19A. The explosive actuator can include a piston 1906 based on a bellows geometry that extends when pressurized. This piston 1906 can be actuated using explosive combustion. When actuated, this piston 1906 can expand rapidly to impart an impulse on the robotic body and cause it to leap.

Figure 19B:
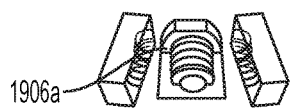
Figure 19C:
Figure 19D:

The piston 1906 can be formed by securing, such as by gluing, two pieces of molded elastomer. One of the two pieces for forming the piston 1906 is shown in FIG. 19B. FIG. 19C shows the piston 1906 in its relaxed state and FIG. 19D shows the piston 1906 in its actuated state. As illustrated in FIG. 19D, when the piston 1906 is actuated, the piston 1906 can stretch linearly.

In some embodiments, the fuel combustion can occur within the explosive actuator. In this case, the explosive actuator can receive fuel, oxygen and ignition trigger to host the fuel combustion. In other embodiments, the fuel combustion can occur in a separate combustion chamber. In this case, the explosive gas can be provided to the explosive actuator pneumatic channel, such as a tubing.

Figure 19E:
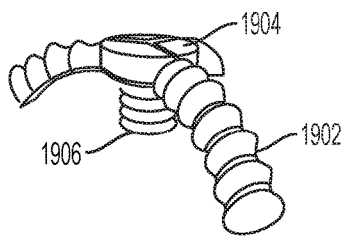
Figure 19F:
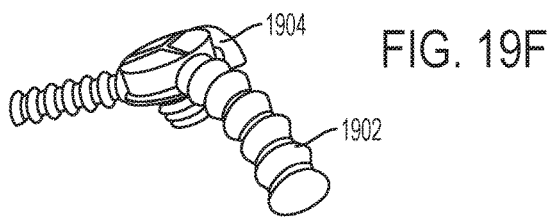

This piston 1906 can be attached to the robotic body as illustrated in FIG. 19E. When the piston 906 is actuated, the piston 906 can press against the ground, thereby providing a jumping motion of the robotic body. Depending on which of the plurality of pneumatic actuators is actuated, the piston 1906 can point to different directions, as illustrated in FIG. 19F. If the piston 1906 is actuated while it is oriented towards a particular direction, the robotic device can jump along that particular direction. Therefore, the jumping direction of the soft robotic actuator can be controlled by pre-configuring the pneumatic actuators.

Figure 19G:
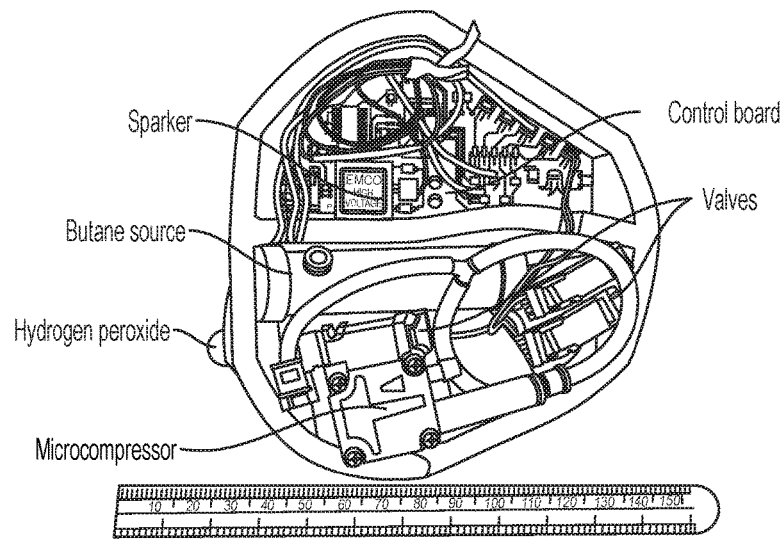

In some embodiments, the soft robot can include an on-board control system 1904, thereby forming an untethered soft robot. FIG. 19G shows an on-board control system 1904 for the soft robot in accordance with certain embodiments of the disclosed subject matter. The control system 1904 can include an on-board actuation system that includes a fuel tank, a tank carrying an oxygen source (e.g., hydrogen peroxide), valves, a microcompressor, an ignition trigger that can initiate combustion of the fuel in the fuel tank, and a control board that controls the operation of the on-board actuation system.

Figure 20:
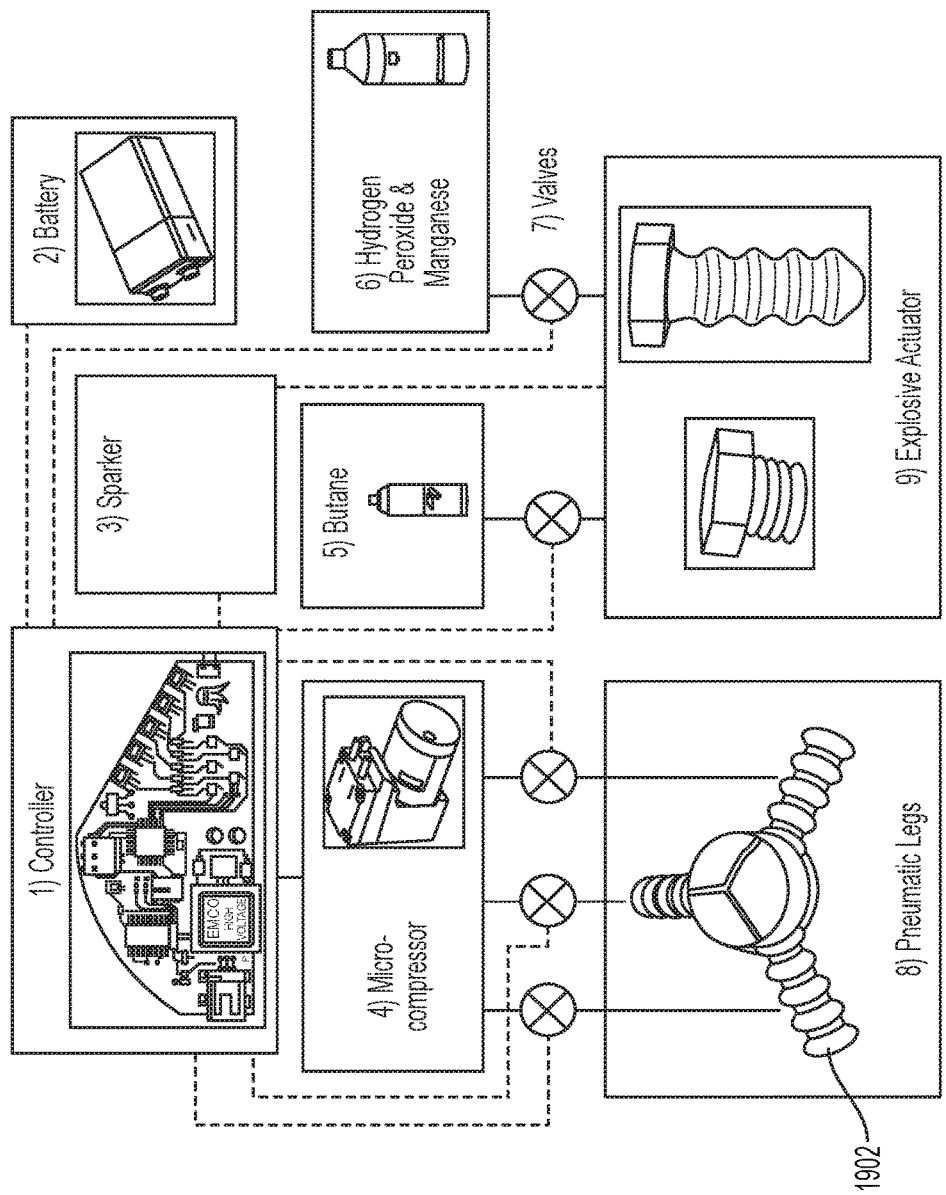
FIG. 20 illustrates a system schematic of a soft robot in accordance with certain embodiments of the disclosed subject matter.

FIG. 20 illustrates a system schematic of a soft robot in accordance with certain embodiments of the disclosed subject matter. As shown in FIG. 19A-19G, the soft robot can include a robotic body including a plurality of pneumatic actuators 1902, an explosive actuator 1906, and a control system 1904 including a microcompressor for providing pressurized gas to the pneumatic actuators, a fuel tank comprising fuel for combustion, an ignition trigger for initiating the fuel combustion, a tank for the oxygen source (e.g., hydrogen peroxide) and the catalyst (e.g., manganese) for providing oxygen for fuel combustion, a control board and the control board's battery. The microcompressor can actuate one or more of the pneumatic actuators to orient the jumping motion. The control board can control the on-board actuation system to control the motion of the soft robot.

The fuel tank can include one or more of ethane, butane, methane, gasoline, or any other hydrocarbon materials suitable for combustion. The stoichiometry of fuel combustion can favor an oxidative environment with higher oxygen concentration than air in standard temperature and pressure (STP) conditions. To provide an enriched oxygen environment, the control system 1904 can decompose the oxygen source, such as hydrogen peroxide ($H_2O_2$, 10%), to provide oxygen for combustion. The decomposition of the oxygen source can be aided using a catalyst, such as manganese.

The fuel-tank and the sparker can provide explosive gas for actuating the piston 1906. For example, the energy obtained by combustion of butane is 28 MJ/L or 49 MJ/kg, by comparison, the energy density of compressed air at 300 bar is 0.2 MJ/L or 0.5 MJ/kg. Therefore, the on-board actuation system can provide powerful actuation of the piston 1906.

The valves in the control system 1904 can include solenoid valves. The solenoid valves can be used to dispense the butane and oxygen into a reaction chamber or the explosive actuator. To dispense 5 ml of butane, the valve can be open for 5 milliseconds; to dispense 30 ml of oxygen gas, the valve can be open for 10 seconds.

In some embodiments, the soft robot can be heavy due to the on-board control system 1904. For example, the weight of the soft robot illustrated in FIG. 19A-19G is 460 g. To actuate such heavy robots, the control system 1904 can use a larger volume of fuel to actuate the explosive actuator. For example, the control system 1904 can use 20 ml of butane per combustion. Therefore, the explosive actuator as well as the pneumatic actuator should be designed to withstand a large physical strain and a sudden pressure increase during the combustion event. To address this issue, the explosive actuator and/or the pneumatic actuator can be fabricated using a tough silicone rubber that can withstand about 300 $MJ/cm^3$ of pressure. The tough silicone rubber can include polyurethane, Room Temperature Vulcanizing (RTV) rubber, and/or two-component, Room Temperature Vulcanizing rubber, such as M4600, M4601 from Wacker chemical.

The control board can activate the microcompressor and solenoid valves to inflate the pneumatic actuators, setting the pose for the jump. Another pair of valves can then be activated to dispense butane and oxygen into the explosive actuator where a spark ignites the mixture of butane and oxygen to cause the jumping motion of the robot. This jumping motion can be completely untethered and autonomous. The new robotic structure and the new materials enable the soft robot to receive pressurized gas having pressure of about 20 psi, which is about 5 times higher than the highest pressure that can be handled by existing soft robots. Accordingly, the disclosed soft robot can address larger loads (e.g., heavier loads.)

Figure 21C:
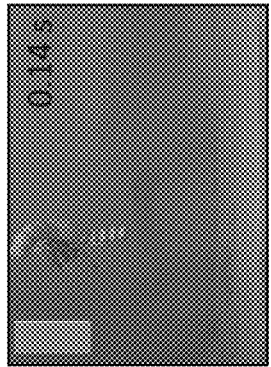
FIGS. 21A-21E illustrate a jumping motion of the soft robot in accordance with certain embodiments of the disclosed subject matter.
Figure 21B:
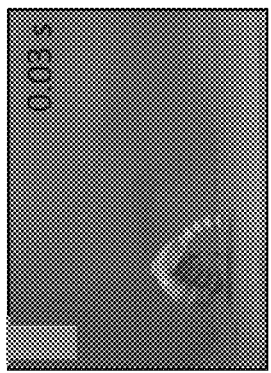
Figure 21A:
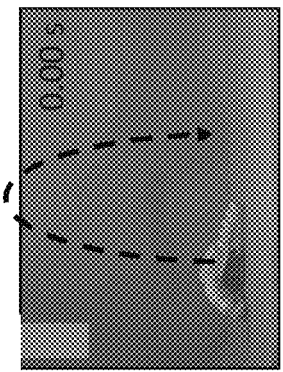
Figure 21E:
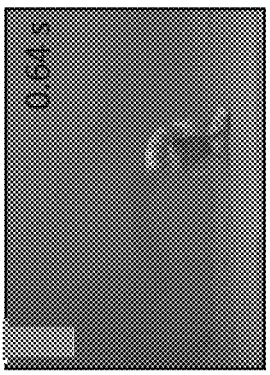
Figure 21D:
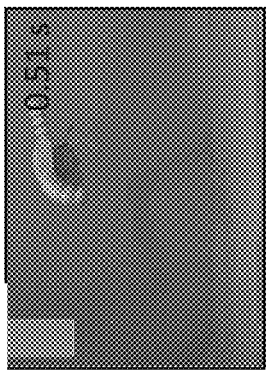

FIGS. 21A-21E illustrate a jumping motion of the soft robot in accordance with certain embodiments of the disclosed subject matter. The robot can reach about 0.6 meter of height and about one meter of displacement. The jump can be completed in 0.7 seconds. The dashed line in FIG. 21A is a trace of the robot's center of mass during its jump. FIGS. 21B-21E are snapshots along the trajectory of the jump at indicated times.

In the experiment illustrated in FIGS. 21A-21E, the explosive actuator was actuated with about 5 ml (i.e., about 12 mg) of butane and about 30 ml (i.e., about 43 mg) of oxygen gas. The energy output from this quantity of methane (12 mg) is about 300 J and the resulting potential energy gain from moving a 460 g object (the weight of the soft robot is 460 g) to a height of 0.6 meters is ~3 J. Therefore, the efficiency of this jump is about 1%.

Figures 22C, 22D:
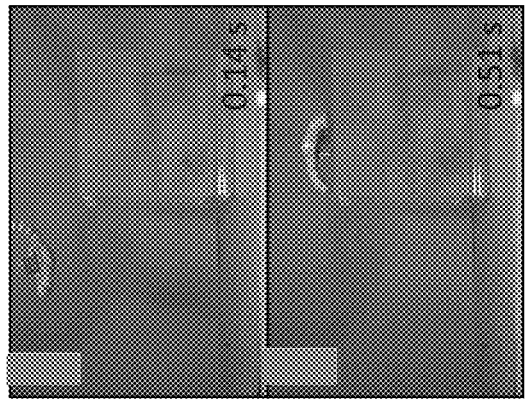
FIGS. 22A-22D illustrate a targeted, directional jumping motion of the soft robot in accordance with certain embodiments of the disclosed subject matter.
Figures 22A, 22B:
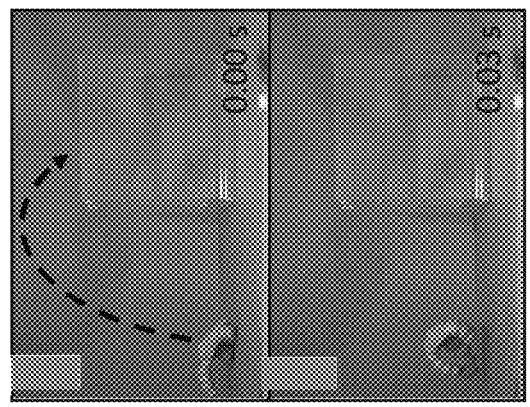

FIGS. 22A-22D illustrate a targeted, directional jumping motion of the soft robot in accordance with certain embodiments of the disclosed subject matter. The soft robot is configured to jump onto a 0.5 m tall object. The dashed line in FIG. 22A is a trace of the robot's center of mass during its jump. FIG. 22B-22D are snapshots along the trajectory of the jump at the indicated times.

In some embodiments, the soft robot and the components coupled to the soft robot can be controlled using software running on a computational device. The software needed for implementing the control process includes a high level procedural or an object-orientated language such as MATLAB®, C, C++, C#, Java, or Perl. The software may also be implemented in assembly language if desired. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:
1. An untethered robotic device, comprising:
a flexible body having a fluid chamber, wherein the flexible body comprises an elastically extensible material and a portion of the flexible body comprises a strain limiting layer that is strain limiting relative to the elastically extensible material, wherein the flexible body is configured to bend around the strain limiting layer upon receiving pressurized fluid in the fluid chamber;

a pressurizing inlet in fluid communication with the fluid chamber; and an untethered pressurizing device on the robotic device in fluid communication with the pressurizing inlet, wherein the pressurizing device is separate from the fluid chamber and is configured to generate the pressurized fluid in order to provide the pressurized fluid to the fluid chamber of the flexible body.

2. The robotic device of claim 1, wherein the pressurizing device comprises a gas-producing reagent selected to provide a gas in a thermal decomposition reaction.

3. The robotic device of claim 2, wherein the pressurizing device comprises an electrolytic cell and the gas-producing reagent is selected to provide a gas product during electrolysis.

4. The robotic device of claim 2, wherein the pressurizing device further comprises a resistive wire in thermal contact with the gas-producing reagent, and wherein the resistive wire is configured to receive electric current.

5. The robotic device of claim 2, wherein the gas producing reagent comprises azide salt.

6. The robotic device of claim 1, wherein the pressurizing device includes a gas-producing reagent selected to provide a gas in an oxidative decomposition reaction.

7. The robotic device of claim 6, wherein the pressurizing device further comprises an oxidizer in contact with the gas-producing reagent.

8. The robotic device of claim 1, wherein the pressurizing device comprises a microcompressor.

9. A method of actuating a robotic device, comprising:
providing a robotic device according to claim 1; and
providing the pressurized fluid from the untethered pressurizing device to the fluid chamber in the flexible body to cause the flexible body to bend around the strain limiting layer.

10. A soft robotic system comprising:
a flexible body having a pneumatic actuator and an explosive actuator, wherein the pneumatic actuator is configured to deform upon receipt of pressurized gas, and wherein the explosive actuator is configured to receive a fuel;
a pressurizing inlet in fluid communication with the pneumatic actuator and a pressurizing gas source; and
an ignition trigger configured to trigger a combustion of the fuel in the explosive actuator, thereby providing explosive gas to the explosive actuator,
wherein the explosive actuator comprises a bellows structure.

11. The soft robotic system of claim 10, further comprising a fuel tank to provide the fuel to the explosive actuator.

12. The soft robotic system of claim 10, further comprising a tank for carrying an oxygen source, wherein the tank is configured to provide oxygen to the explosive actuator.

13. The soft robotic system of claim 12, wherein the tank further comprises a catalyst for decomposing the oxygen source into oxygen.

14. The soft robotic system of claim 10, further comprising a pressurizing device for providing the pressurized gas to the pneumatic actuator.

15. The soft robotic system of claim 14, wherein the pressurizing device comprises a microcompressor.

16. A soft robotic system comprising:
a flexible body having a pneumatic actuator and an explosive actuator, wherein the pneumatic actuator is configured to deform upon receipt of pressurized gas, and wherein the explosive actuator is configured to receive a fuel;
a pressurizing inlet in fluid communication with the pneumatic actuator and a pressurizing gas source; and
an ignition trigger configured to trigger a combustion of the fuel in the explosive actuator, thereby providing explosive gas to the explosive actuator,
wherein the pneumatic actuator is configured to orient the explosive actuator upon receipt of the pressurized gas, and wherein the explosive actuator is configured to provide a jumping motion to the soft robotic system in the orientation provided by the pneumatic actuator, upon the combustion of the fuel.

* * * * *